(12) United States Patent
Vemury et al.

(10) Patent No.: US 12,142,098 B2
(45) Date of Patent: Nov. 12, 2024

(54) SKIN REFLECTANCE IMAGE CORRECTION IN BIOMETRIC IMAGE CAPTURE

(71) Applicant: The Government of the United States of America, as represented by the Secretary of Homeland Security, Washington, DC (US)

(72) Inventors: Arun R. Vemury, North Bethesda, MD (US); Yevgeniy B. Sirotin, Severna Park, MD (US); Cynthia M. Cook, Pittsburg, PA (US); John J. Howard, Bethesda, MD (US); Jerry L. Tipton, Severn, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/410,616

(22) Filed: Jan. 11, 2024

(65) Prior Publication Data

US 2024/0177550 A1 May 30, 2024

Related U.S. Application Data

(63) Continuation of application No. 17/185,588, filed on Feb. 25, 2021, now abandoned.

(Continued)

(51) Int. Cl.
*G07C 9/00* (2020.01)
*G06V 10/141* (2022.01)
(Continued)

(52) U.S. Cl.
CPC ....... *G07C 9/00563* (2013.01); *G06V 10/141* (2022.01); *G06V 40/161* (2022.01);
(Continued)

(58) Field of Classification Search
CPC ............ G07C 9/00563; G06V 10/141; G06V 40/168; G06V 40/172; G06V 40/161;
(Continued)

(56) References Cited

U.S. PATENT DOCUMENTS

2006/0102843 A1 5/2006 Bazakos et al.
2009/0060293 A1 3/2009 Nagao et al.
(Continued)

FOREIGN PATENT DOCUMENTS

WO WO-2019166238 A1 * 9/2019 ............ G01J 1/0219

OTHER PUBLICATIONS

Buolamwini, Joy, et al., Gender Shades: Intersectional Accuracy Disparities in Commercial Gender Classification, Proceedings of Machine Learning Research, 81, pp. 1-15, 2018.
(Continued)

*Primary Examiner* — Sath V Perungavoor
*Assistant Examiner* — Kristin Dobbs
(74) *Attorney, Agent, or Firm* — Lavanya Ratnam; Robert W. Busby; Nathan Grebasch

(57) ABSTRACT

In examples, a relative skin reflectance of a captured image of a subject is quantified. Based on the relative skin reflectance, the captured image is determined as suitable or not suitable for biometric identification. When the captured image is determined not suitable, a remedial capture setting is calculated and provided to an image capturing resource. Another captured image of the subject, captured under the remedial capture setting, is received from the image capturing resource. The relative skin reflectance of the another captured image is quantified and based thereon, there is a determining of whether the another captured image is suitable or is not suitable.

23 Claims, 17 Drawing Sheets

Related U.S. Application Data

(60) Provisional application No. 62/983,206, filed on Feb. 28, 2020.

(51) Int. Cl.
  *G06V 40/16* (2022.01)
  *H04N 23/611* (2023.01)
  *H04N 23/71* (2023.01)
  *H04N 23/74* (2023.01)
  *H04N 23/76* (2023.01)

(52) U.S. Cl.
  CPC .......... *G06V 40/162* (2022.01); *G06V 40/166* (2022.01); *G06V 40/168* (2022.01); *G06V 40/172* (2022.01); *H04N 23/611* (2023.01); *H04N 23/71* (2023.01); *H04N 23/74* (2023.01); *H04N 23/76* (2023.01)

(58) Field of Classification Search
  CPC .... G06V 40/162; G06V 40/166; H04N 23/76; H04N 23/74; H04N 23/71; H04N 23/611
  USPC .......................................................... 348/77
  See application file for complete search history.

(56) References Cited

U.S. PATENT DOCUMENTS

| | | |
|---|---|---|
| 2014/0129289 A1 | 5/2014 | Phan et al. |
| 2016/0202047 A1 | 7/2016 | Aoki |
| 2019/0212125 A1 | 7/2019 | Deleule et al. |
| 2019/0213309 A1* | 7/2019 | Morestin ................ G01S 17/04 |

OTHER PUBLICATIONS

Verifiable Credentials Use Cases, W3C Working Group Note Sep. 24, 2019, https://www.w3.org/TR/2019/NOTE-vc-use-cases-20190924.

Cook, Cynthia M. et al., Demographic Effects in Facial Recognition and their Dependence on Image Acquisition: An Evaluation of Eleven Commercial Systems, IEEE Transactions on Biometrics, Behavior, and Identity Science (IEEE T-BIOM), Mar. 2019.

Taylor, Michael J. et al., "Adaptive skin segmentation via feature-based face detection," Proceedings of SPIE 9139, Real-Time Image and Video Processing, May 15, 2014, 91390P.

Viola, Paul, et al., Robust Real-Time Face Detection, International Journal of Computer Vision 57(2), pp. 137-154, 2004.

Taylor, Michael J., and Tim Morris, "Adaptive Skin segmentation via feature-based face detection," Real-Time Image and Video Processing 2014. vol. 9139. SPIE, 2014. (Year: 2014).

* cited by examiner

FIG. 7
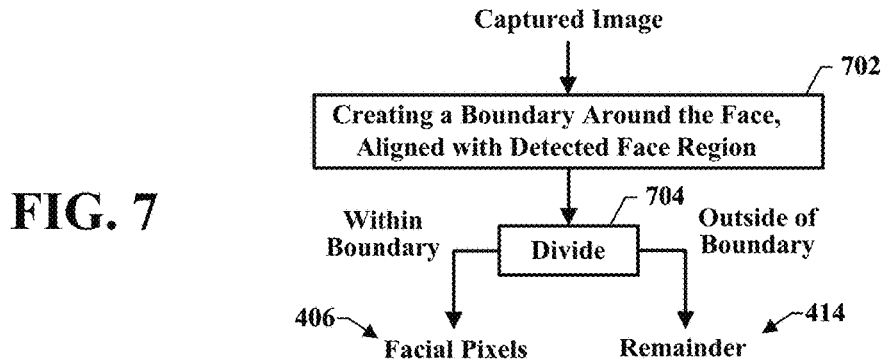
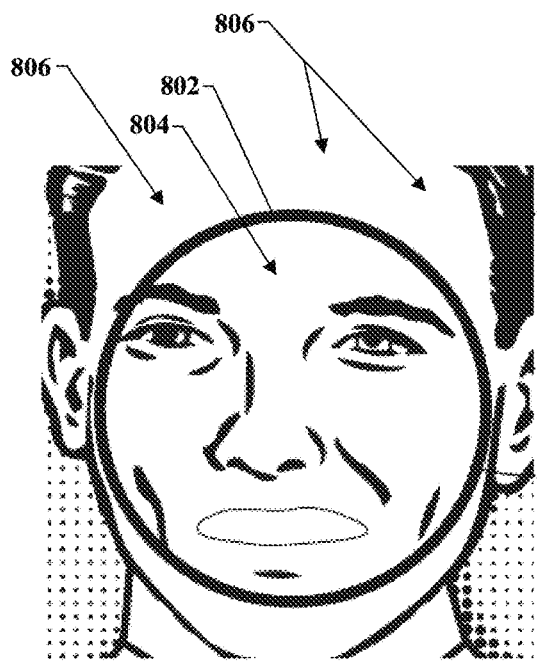
FIG. 8A
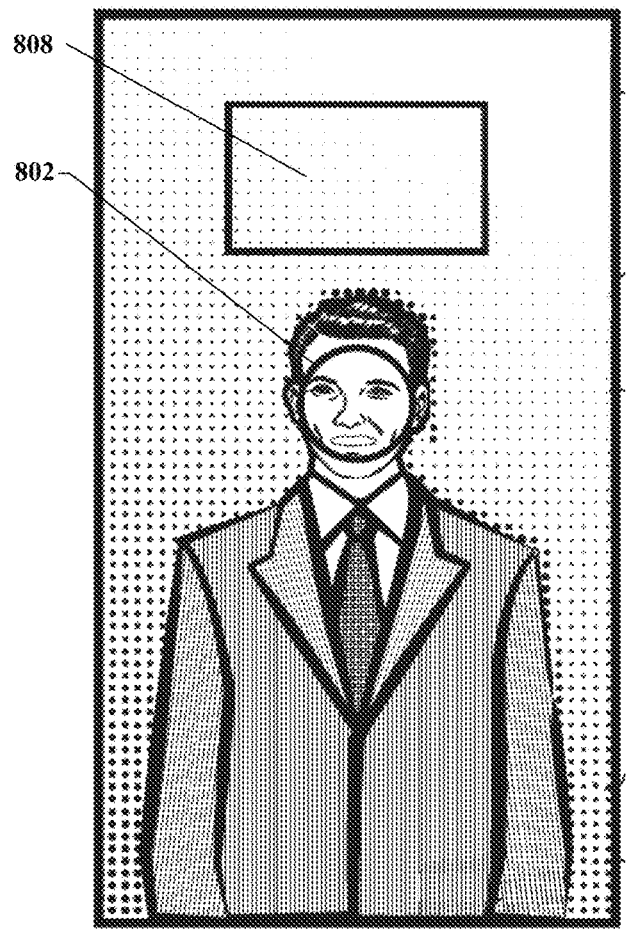
FIG. 8B

SKIN REFLECTANCE IMAGE CORRECTION IN BIOMETRIC IMAGE CAPTURE

CROSS-REFERENCE TO RELATED APPLICATIONS

This application in a continuation of U.S. patent application Ser. No. 17/185,588 filed Feb. 25, 2021 (incorporated by reference in the entirety) which claims the benefit under 35 U.S.C. § 119(e) to U.S. Provisional Patent Application No. 62/983,206, filed Feb. 28, 2020, entitled "Quantification of Phenotypes in Biometric Image Capture," which is incorporated by reference in the entirety.

STATEMENT OF GOVERNMENT SPONSORSHIP

This application is based on research performed under funding from the U.S. Department of Homeland Security under contract number W911NF-13-D-0006-0003. The Government has certain rights in the subject matter of this disclosure.

FIELD

The application relates generally to biometric identification.

SUMMARY

A system for the quantification of phenotypes in received captured images and remediation of image capture, for biometric matching, may include a processing system having a hardware processor configured to perform a predefined set of basic operations by loading corresponding ones of a predefined native instruction set of codes, the predefined native instruction set of codes constituting a set of instructions selectable for execution by the hardware processor. The system may include a memory accessible to the processing system, and may include a communication controller, under control of the processing system, adapted to receive an indication that a first relative skin reflectance value derived from a first image of a subject is outside of a predetermined range. The system may include, stored in the memory, an image processing logic and an image capture logic. The image processing logic may comprise a respective sequence of instructions selected from the predefined native instruction set of codes of the hardware processor, adapted to calculate an adjustment of one or more conditions for capture of a second image of the subject, as a remedial capture setting. The image capture logic may comprise another respective sequence of instructions selected from the predefined native instruction set of codes of the hardware processor, adapted to capture the second image of the subject under the remedial capture setting. The image processing logic may be further adapted to derive, from the second image, a second relative skin reflectance value for a face of the subject, and to determine whether the second relative skin reflectance value is between a floor threshold and a ceiling threshold.

A method for quantifying of phenotypes in received captured images capture, for remediation of image capture, for biometric matching may include identifying that a first relative reflectance value, derived from a first image of a subject, is outside of a predetermined range of reflectance and may include, based at least in part on the identifying: calculating a remedial capture setting, and communicating the remedial capture setting to an image capturing resource. The method may further include, upon receiving a second image of the subject, captured by the image capturing resource under the remedial capture setting, deriving from the second image of the subject a second relative reflectance value, the second relative reflectance value being for at least a portion of an image of the face of the subject, and determining whether the second relative reflectance value is within a window of suitable reflectance values.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 7 shows a flow diagram of operations in an implementation of dividing a facial region into facial pixels and remainder pixels, in processes for quantifying relative reflectance in systems and methods according to one or more embodiments.

FIG. 8A shows an example face boundary on a captured image, in a process of separating of a facial region into facial pixels and remainder pixels; and FIG. 8B shows a zoom-out from the FIG. 8A view.

DETAILED DESCRIPTION

Overview

Various embodiments, configurations, features, and operations are described using airports as an example environment, and security screening with image capture and biometric image matching as an example application. Ronald Reagan Washington National Airport (referred to hereinafter as National Airport) provides a concrete use case as but one example environment. It will be understood though, that airports are only an example environment for practices according to disclosed embodiments.

Features of an example will be described assuming an embodiment in accordance with this disclosure connects to and interfaces with one or more security screening resources at National Airport. It will be assumed that the embodiment connects to and interfaces with an image capture kiosk and a biometric matching resource. The example will assume Mark as a subject, and that Mark has arrived, via ground transport from his residence in Washington DC, at National Airport. It will be assumed that Mark, prior to checking his luggage, stops at a biometric image capture station.

The biometric image capture station captures an image of Mark. The station sends the captured image of Mark to a phenotype quantification system, configured to quantify a skin reflectance value of Mark's facial skin, as captured in the image. The phenotype quantification system processes the captured image and determines a quantified skin reflectance value for the facial skin in the image. The phenotype quantification system can compare the quantified skin reflectance value to one or more qualification thresholds. In one or more embodiments, the captured image is input to the biometric matching system only when the quantified reflectance meets the one or more thresholds. Embodiments can be configured to apply remediation processes when the captured images quantified reflectance does not meet thresholds, before the image is input to the biometric matching system.

The qualification thresholds have been determined from particular analyses as obtaining, when applied as a qualifier for captured images to be used for biometric matching, a statistically significant improvement in biometric image matching performance.

Embodiments

Figure 1:
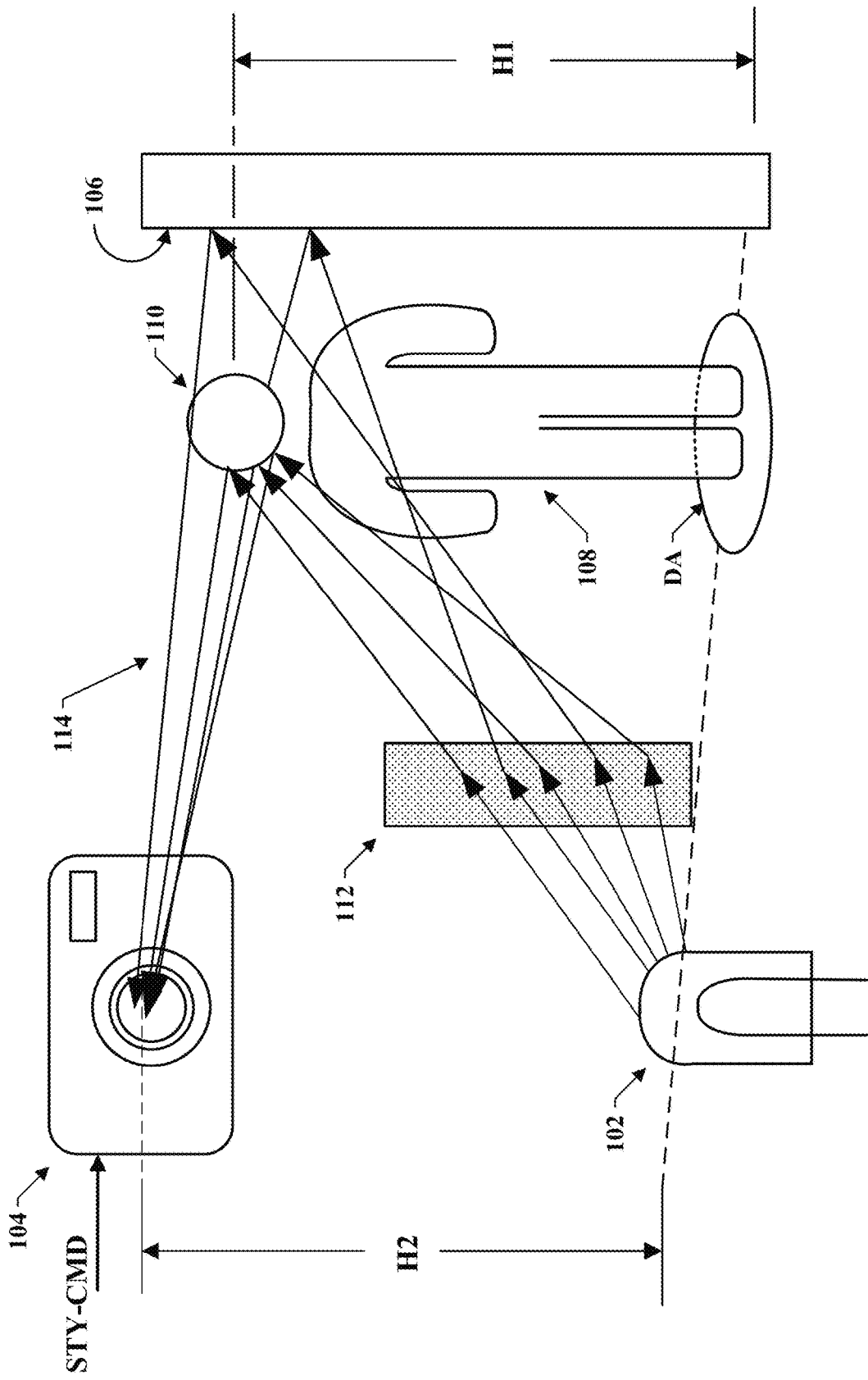
FIG. 1 illustrates an example operating environment for capture of images, in systems and methods in accordance with one or more embodiments.

FIG. 1 illustrates an implementation of one image capture system 100 (hereinafter "system 100"). This system may capture images and may interface and operate with systems and methods in accordance with various embodiments. System 100 can include a light source 102, a digital camera 104 and, optionally, a background surface 106, such as a neutral background (gray). In an aspect, the digital camera 104 can feature an adjustable spectral sensitivity, configured to receive a spectral sensitivity command, such as the example STY-CMD command shown in FIG. 1. Control logic for generating STY-CMD or an equivalent spectral sensitivity command is described in greater detail below, and in reference to FIG. 17.

The light source 102 can be configured to illuminate a subject 108 when positioned, e.g., standing or sitting, in what may be a designated area DA in front of the background surface 106 if used. The center of the subject's face 110 is at height H1. The height H2 of the digital camera 104 can be adjusted, for example, to be the same as height H1.

System 100 can provide a constant medium (e.g., air) light path from the light source 102 to the subject 108. Additionally, or alternatively, the system 100 can provide a light diffuser 112 between the light source 102 and the subject 108. The light diffuser 112, if used, may be implemented by an adjustable light diffusion apparatus, e.g., a commercial off-the-shelf (COTS) adjustable diffuser such as is available from various vendors.

Implementations of the light source 102 can be, for example, controllable LED lights or other lights. The light source 102 is not necessarily a system 100 dedicated resource, as one or more implementations of system 100 can utilize, but can be switched on or off or adjusted to take into account ambient light as part or all of the light source 102.

FIG. 1 shows a single light source 102 but that is not intended as a limitation on quantity or positioning of light sources. Light source 102 can be among a plurality of light sources, which can be at respective positions relative to the subject 108. The plurality of light sources, if used, can be of a common type, or one or more of the light sources can be of one type and another one or more can be of another type. In implementations using multiple light sources 102, one or more of the light sources may be provided with a light diffuser, such as the light diffuser 112.

In another adaptation the system 100 can use illumination outside the visible light spectrum, e.g., ultraviolet (UV) light, as a supplement to or as an alternative to visible light. In another adaptation, the system 100 can use, instead of or in addition to the digital camera 104, an image capture device other than a camera.

In an operation, light incident on skin surfaces of the subject's face 110 and on other surfaces of the subject 108, and on background surface 106, is reflected back as reflection rays 114, which are captured by the digital camera 104 or the like to form a digital image.

In an implementation, the digital camera 104 can be integrated in a kiosk, and functionality of the kiosk can include, in addition to capturing an image of the subject 108, accepting an identification credential from the subject 108. Example identification credentials include electronic credentials such as a mobile driver's license (mDL) that contains a reference image and contains, in some embodiments, other biometric information for an asserted identity. The electronic credential can be provisioned to a mobile device such as a smartphone or the like. The kiosk can be configured to receive the reference image and, for example, other biometric information, and in one or more embodiments the received reference image from the identification credential can be used for comparison against the captured image, as described in greater detail in later sections. Contemplated implementations also include the kiosk being configured with a scanner to receive, for example, a visible reference image from a physical identification card, such as a physical driver's license.

Figure 2:
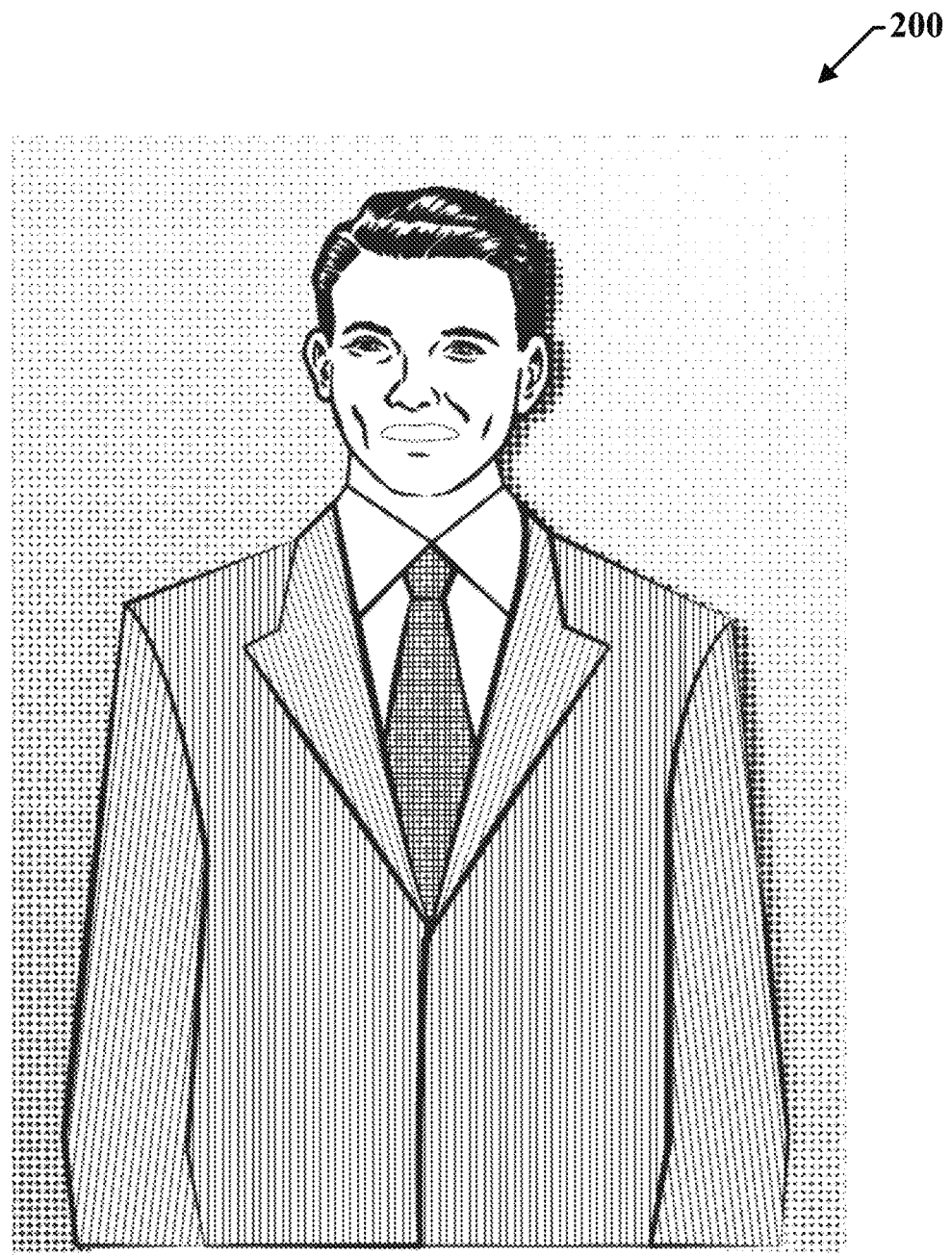
FIG. 2 illustrates an example image capture of a generic subject person, for description of various features in systems and methods according to one or more embodiments.

FIG. 2 illustrates visible aspects 200 of one generic subject person, as may be a subject 108 for image capture, for post-capture phenotypic quantification processes, and other processing in accordance with various disclosed embodiments.

Some example implementations of computer-implemented methods in accordance with one or more embodiments for calculating a relative skin reflectance will now be described. Reference will be made to devices, systems, hardware, software, and other phenotypic information that can be used in conjunction with or independent of the described methods and steps.

Practices in accordance with disclosed embodiments can include modifications, variations, adaptations, combinations, and re-arrangements of described examples. For example, a system may implement other phenotypic measures to determine whether acquired data is suitable for subsequent use.

Example capture devices are operational to electronically obtain one or more images of an individual's face, e.g., facial features, or the like that are usable to uniquely identify the person based on biometric information obtained from them. Though devices operating in the visible portion of the electromagnetic spectrum are discussed, other energy ranges, e.g., infrared, UV, are contemplated as well. In accordance with this disclosure, different energy ranges may be implemented in combination or for different purposes. For example, a visible light digital camera can be used to acquire an initial image while another digital capture device (or a portion of the device) can be used to capture an additional image. These approaches may be implemented for a variety of purposes, such as to promote equitability across different populations.

In an example, a digital camera can capture an electronic image that includes a representation of a human face. The digital camera can communicate the data forming the captured image to a computing system that can be configured to calculate the skin reflectance on the facial portion of the image and output an indication of whether the skin reflectance is or is not within a predetermined range of acceptability. It will be understood that "predetermined range" may be alternatively referred to as "range of acceptability," "given range," "predetermined range of acceptability," "acceptable range of reflectance," and so forth. For brevity, "acceptable range of reflectance" will be used in subsequent paragraphs.

The acceptable range of reflectance may be based on various factors. Example factors can include, but are not limited to, the particular facial identification algorithm(s) that will receive the captured digital images. As an illustration, one acceptable range of reflectance can be assigned to or tailored to a first list of biometric identification algorithms, and another acceptable range of reflectance can be assigned to or tailored to a second list of biometric identification algorithms. In accordance with some embodiments, systems and methods can include a dynamic adjustment of the acceptable range of reflectance.

Figure 3:
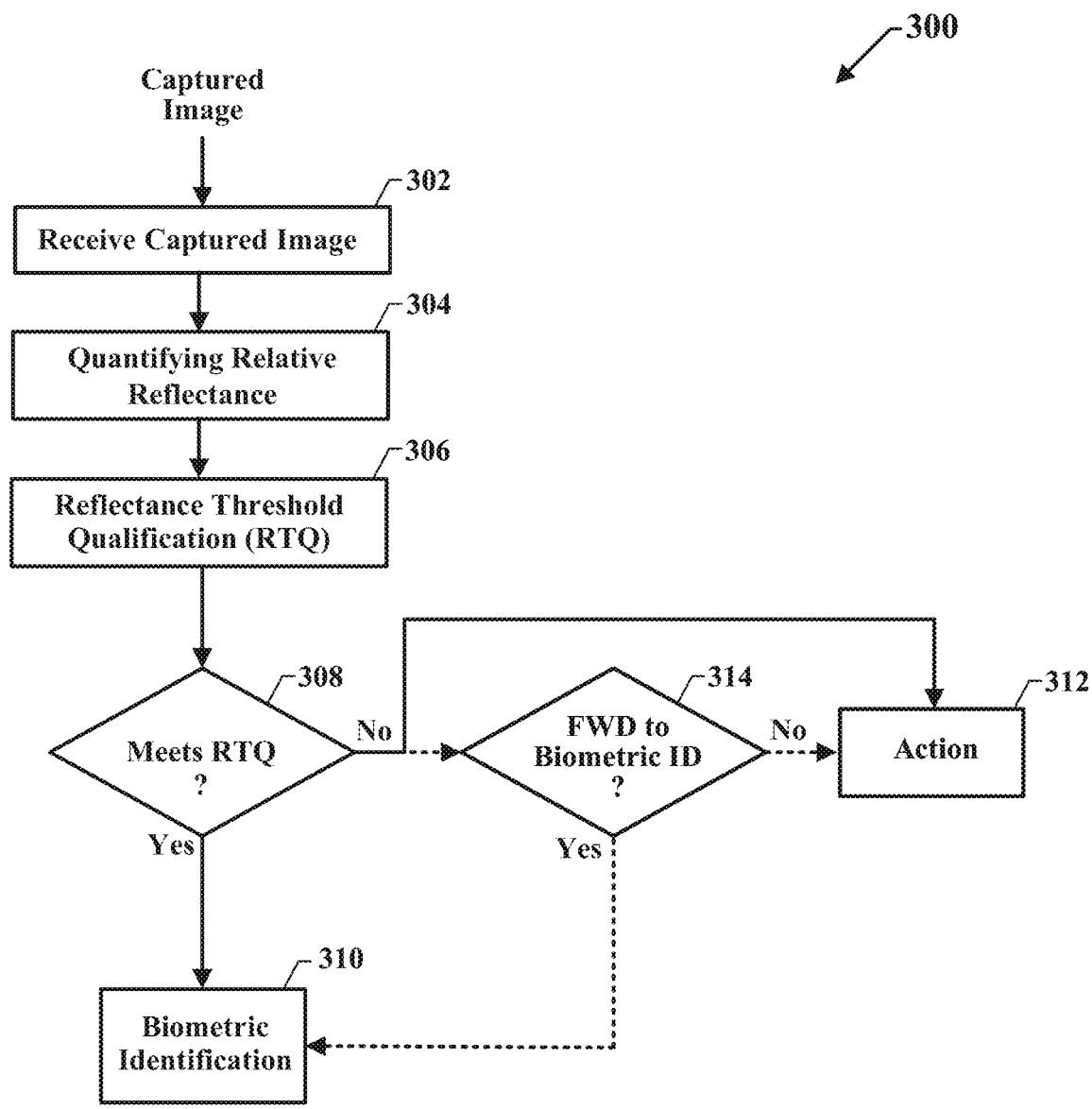
FIG. 3 shows a flow diagram of operations in a process of quantifying reflectance of captured images, with threshold qualified biometric matching, for systems and methods according to one or more embodiments.

FIG. 3 shows a flow diagram of operations in a process 300 for receiving a captured image of a subject, quantifying the relative reflectance of the image's facial skin regions, and qualifying the reflectance against a reflectance threshold. The process 300 also forwards captured images meeting the reflectance threshold to a biometric identification process. Examples will be described with reference to the system 100 as shown in FIG. 1. The reference to the system 100 is not intended to limit practices in accordance with this disclosure to the system 100. Process 300 operations can include receiving 302 the captured image, e.g., from the system 100. Referring to FIG. 1, image capturing can include the light source 102 illuminating, directly or via the light diffuser 112, the subject's face 110 and other surfaces of the subject 108, the background surface 106 if used, and the digital camera 104 capturing the reflected light, as a captured image. Process 300 can then proceed to quantifying 304 the captured image's relative reflectance. Operations in quantifying 304 can include separating facial pixels from other pixels of the captured image. Operations in quantifying 304 can also include computing facial pixels' respective luminances, and normalizing the computed respective luminances using, for example, a mean of the background luminance. Specific implementations and operations in the quantifying 304 are described in greater detail in later sections of this disclosure.

The process 300 can proceed from quantifying 304 the relative reflectance of the captured image to applying a reflectance threshold qualification 306. In various embodiments, the reflectance threshold qualification 306 determines, at least in part, whether the captured image is suitable for use in biometric identification. The reflectance threshold qualification 306 can include comparing, to one or more thresholds, the relative reflectance value output from the quantifying 304. The one or more thresholds can include, for example, a ceiling threshold, i.e., maximum allowable reflectance, or can include a floor threshold, i.e., a minimum allowable reflectance, or can include both. The reflectance threshold qualification 306 can generate, and communicate for subsequent actions or processing, a reflectance qualification indicator of whether the relative reflectance from the quantifying 304 meets the threshold.

The process 300 can proceed, as shown by the "Yes" "outbranch from flow logic block 308, to biometric identification 310 when the reflectance threshold qualification 306 indicates the relative reflectance meets, i.e., is not outside, the reflectance threshold. In an embodiment, as shown by the dotted line from the "No" outbranch of flow logic block 308, the process 300 can proceed to action 312 when the reflectance threshold qualification 306 indicates the relative reflectance does not meet, i.e., is outside, the reflectance threshold. Operations in the actions 312 can be application-specific. In one or more embodiments, operations in the actions 312 can include, without limitation, post-processing correction of the captured image, directed to obtaining a relative reflectance that meets the reflectance threshold qualification 306. In one or more embodiments, operations in the actions 312 can include selecting a remediation, or selecting among a set of remediations, as described in greater detail in later sections. The process 300 can include, in an embodiment, a determination 314 of whether to forward the captured image to the biometric identification 310 regardless of the reflectance threshold qualification 306 indicating the relative reflectance is outside the threshold. Logic configuration of the determination 314, including factors the determination 314 considers can be application-specific.

Referring to the FIG. 3 quantifying 304 of the relative reflectance of the captured image, example configuration in accordance with one or more embodiments will now be described. Description will reference FIG. 4 which is part of this disclosure and shows a logic flow diagram of operations of a process 400. An instance of the process 400 can include receiving 402 a captured image of a subject, for example, receiving from the FIG. 3 capturing 302 a captured image of the FIG. 1 subject 106. The receiving 402 can be at a particularly configured processing resource, such as described later in reference to FIG. 16. FIG. 5 is a graphic 500 of certain patterns of luminance that can be carried in the captured image received in 402. As shown the luminance patterns can define lighter regions, such as the examples labeled "LHT," and darker regions, such as the examples labeled "DK." As described in greater detail in subsequent paragraphs, operations in the process 400 can include detecting the facial region by detecting face-indicating signature patterns of LHT and DK. Operations in the process 400 can also include discarding DK region pixels from consideration in determining relative reflectance of the captured image, as also described later in greater detail.

Upon receiving 402 the captured image the process 400 can proceed to obtaining 404, from the captured image, facial pixels 406 and background pixels 408. Operations in obtaining 404 the facial pixels 406 and background pixels 408 can include applying a face detecting 410 to the captured image, followed by dividing 412 the image into the facial pixels 406 and remainder pixels 414. The dividing 412 can be based at least in part on facial region position information from the face detecting 410.

Regarding the face detecting 410, as introduced above implementations can employ detecting human faces' signature patterns of LHT and DK. One such pattern can be a characteristic LHT, DK, LHT pattern formed by human eyes spaced on opposite sides of a human nose bridge. An example "three-rectangle" feature implementation of the face detecting 410 will now be described in reference to FIGS. 6A and 6B.

Figure 6A:
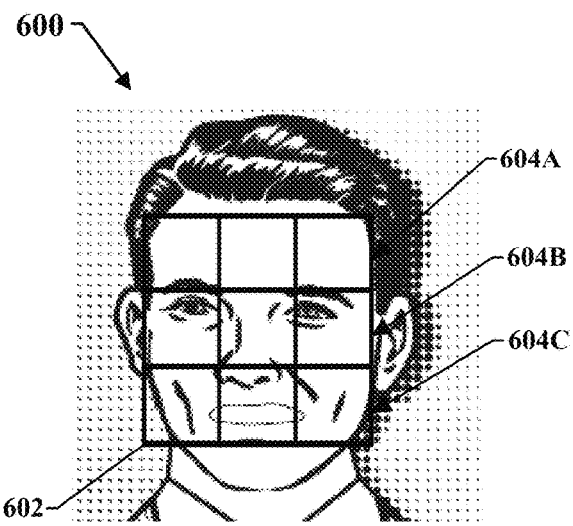
FIG. 6A and FIG. 6B show examples of three-rectangle feature operations in a face detection.
Figure 6B:
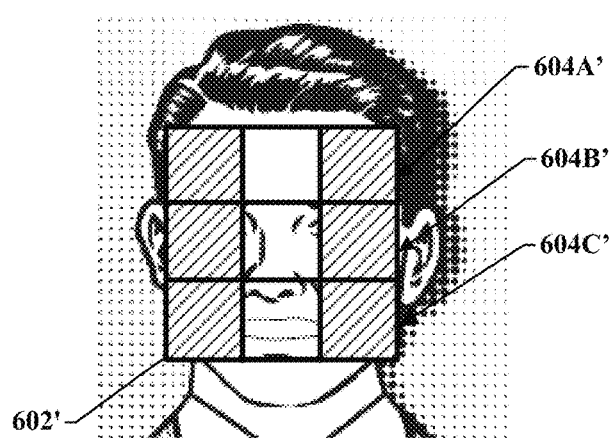

Referring to FIG. 6A, operations in the three-rectangle feature implementation of the face detecting 410 can include iteratively applying, e.g., in a stepping manner, three-rectangle features to the captured image, as shown by the three instances, 604A, 604B, and 604C, within the rectangular region 602. For purposes of description, the three instances, 604A, 604B, and 604C, will be collectively referenced as "three-rectangle features 604." Shown in FIG. 6B rectangular area 602' are annotated versions, items 604A', 604B', and 604C', of the FIG. 6A three-rectangle features 602. The annotation appears as a shading of the outer two rectangles of 604A', 604B', and 604C'. The shading represents operations of subtracting the sum of the intensity of pixels inside one or more rectangles in each three-rectangle feature 604 from the intensity of pixels within the remaining one or more rectangles. In this way, eyes, a nose, and a mouth can be detected. The three-rectangle feature 602 implementation of the face detecting 410 is only an example. Alternative implementations of the face detecting 410 can apply techniques using, for example and without limitation, two-rectangle features, four-rectangle features, and combinations of any two or more multiple rectangle features.

Figure 4:
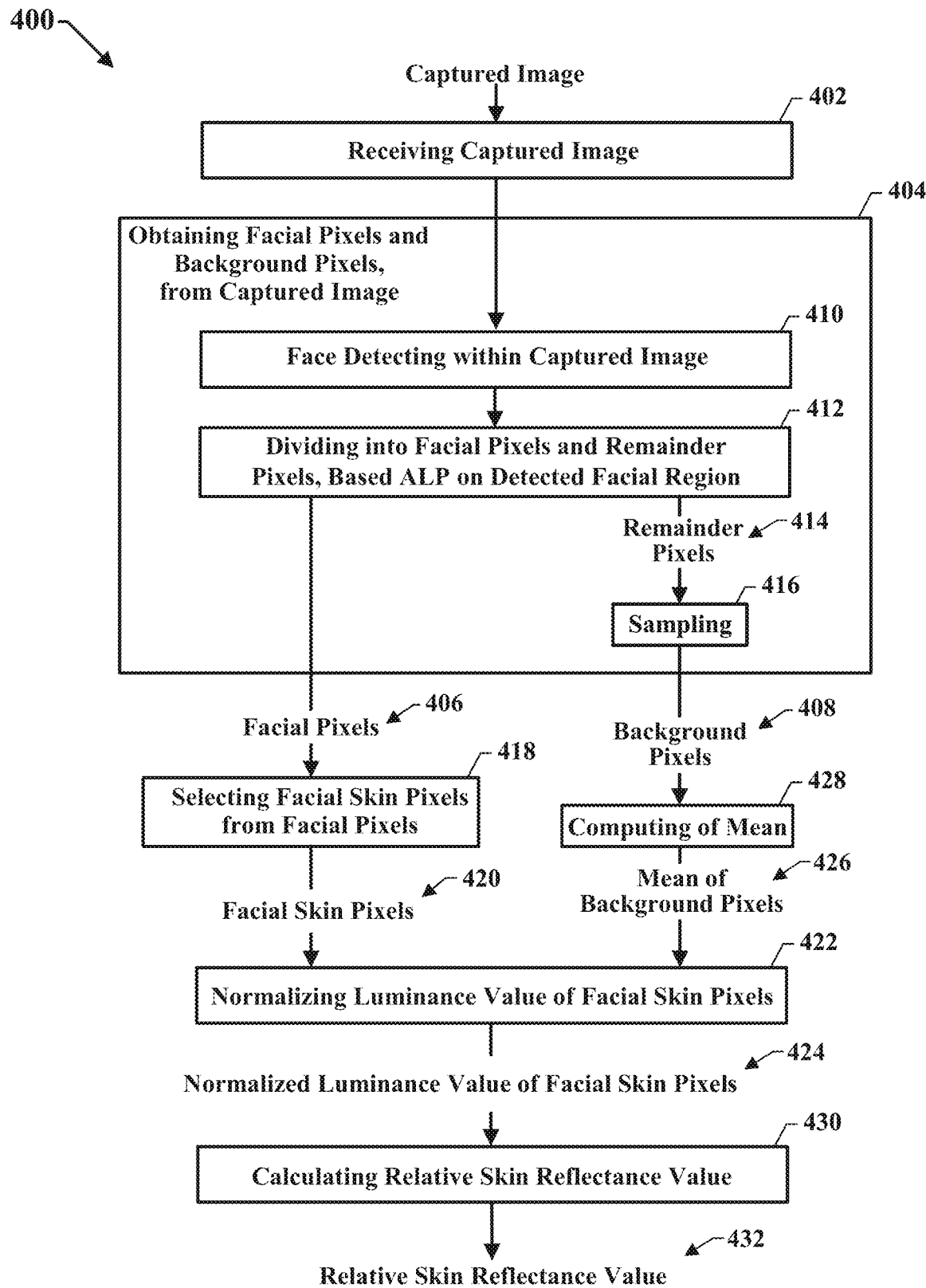
FIG. 4 shows a flow diagram of operations in a process of quantifying relative reflectance, for systems and methods according to one or more embodiments.
Figure 5:
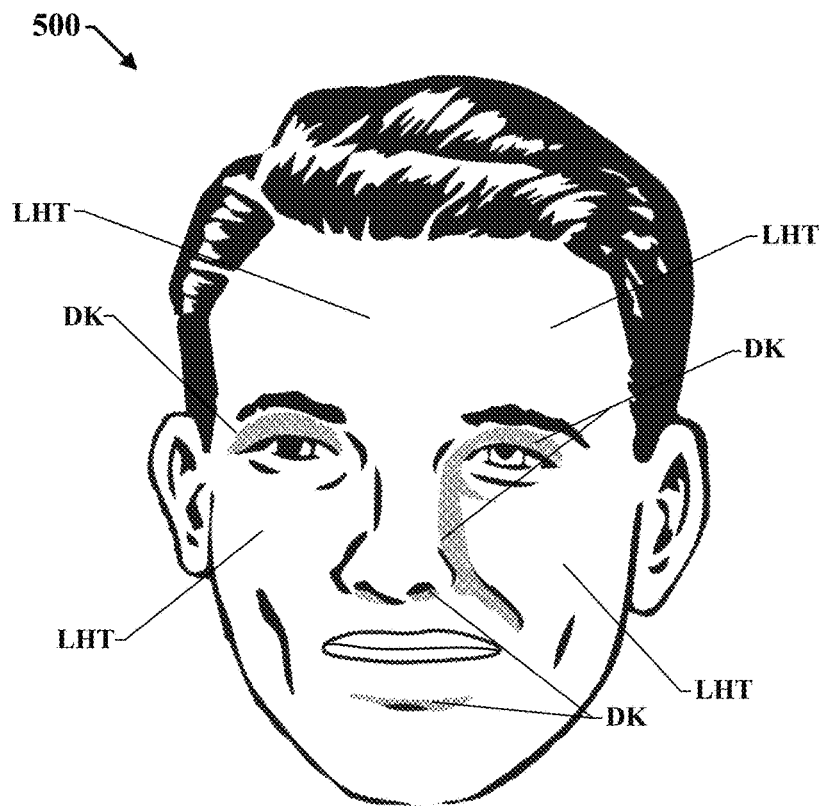
FIG. 5 illustrates an example distribution of lighter and darker regions on a face portion of a captured image in systems and methods according to one or more embodiments.

Referring to FIG. 4 and FIG. 7, operations in dividing 412 the captured image into facial pixels 406 and remainder pixels 414 include creating 702 a boundary aligned with and surrounding a region of the captured image indicated by the face detecting 410. After creating 702, the boundary operations can include dividing 704 pixels of the captured image into the facial pixels 406 and the remainder pixels 414. The dividing 704 can use the boundary as a demarcation. In an implementation, FIG. 4 remainder pixels 414 such as obtained from the FIG. 7 dividing 704 can be used as the background pixels 408. Also, in an implementation, the FIG. 4 background pixels 408 can be obtained from a sampling 416 of remainder pixels 414, as obtained from the FIG. 7 dividing 704, as described in greater detail in later paragraphs.

FIG. 8A shows aspects of creating and applying a mask 802 as an example of the above-described FIG. 7 creating 702 a boundary around and aligned with the detected facial region. The mask 802 can be a circular mask, as shown in FIG. 8A. In a modification, the mask 802 can be formed with an alternative geometry, e.g., an ellipse or oval. FIG. 8B shows a zoom-out from the FIG. 8A view, also showing an example background region 808.

Referring to FIG. 4, process 400 can proceed from obtaining 404 facial pixels 406 and background pixels 408 from the captured image, to selecting 418 facial skin pixels 420 from the facial pixels 406.

Figure 9:
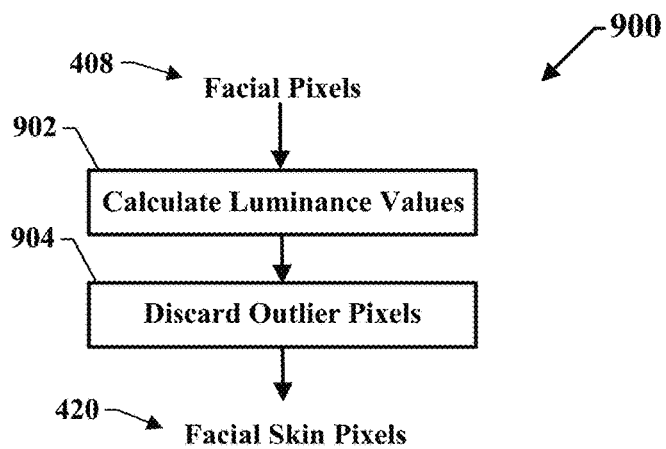
FIG. 9 shows a flow diagram of operations in a process selecting facial skin pixels from facial pixels, for processes in quantifying relative reflectance in systems and methods according to one or more embodiments.

An implementation of the selecting 418 can include operations as shown in the FIG. 9 process 900. The process 900 can include calculating 902 luminance values of the facial pixels 406, then discarding 904 outlier facial pixels. Luminance values of the facial pixels 406 can be calculated, for example, based on a weighted sum of associated color component values, e.g., luminance value calculation. Outlier facial pixels discarded at 904 can be facial pixels 406 with a luminance above a predefined upper level, such as, without limitation, 1.5 standard deviations above a mean of the set of luminance values. Facial pixels 406 with luminance values exceeding this predefined upper level may represent, for example, features other than skin, such as irises of eyes, teeth, and eyewear, for example. Another example of outliers for discarding 904 can be a predefined lower level, such as but not limited to, 1.5 standard deviations below the mean of the set of luminance values. Facial pixels 406 with luminance values below this predefined lower level may represent features other than skin, such as dark facial hair, pupils, nostrils, and oral cavities, for example.

Accordingly, after discarding 904 outlier facial pixels from the facial pixels 406, the remainder can be facial skin pixels 420 that are within an upper and lower standard deviation levels for luminance values. Similar approaches can be used for other phenotypes or covariates with the applicable standard deviation being set based on the applied phenotypic property implemented in the method.

Figure 10:
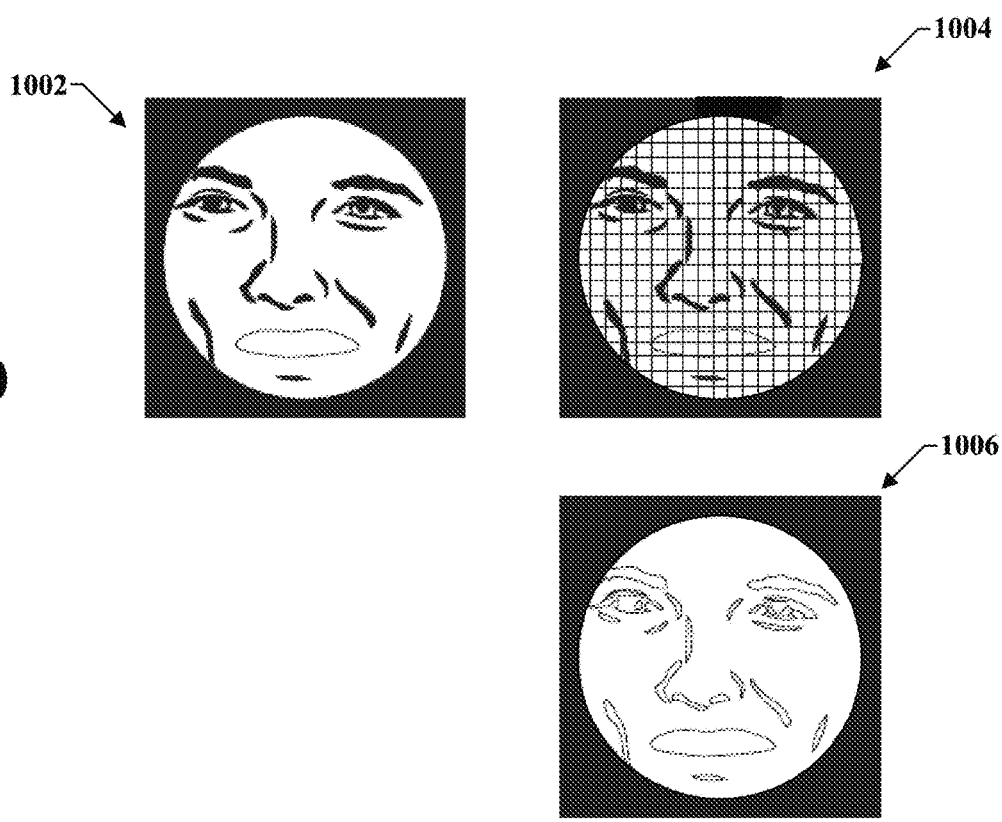
FIG. 10 illustrates example operations in luminance-based outlier removal in selecting facial skin pixels, for processes in quantifying relative reflectance in systems and methods according to one or more embodiments.

Graphic representation of the FIG. 4 selecting 418 and FIG. 9 process 900 discarding 904 can be seen in FIG. 10, where graphic 1002 shows an original pixel resolution of all the facial pixels 406, graphic 1004 shows a coarse representation of the facial pixels in 1002, and graphic 1006 shows a result of the discarding, e.g., the discarding 904 of pixels with luminance value below a predefined lower level.

Figure 11:
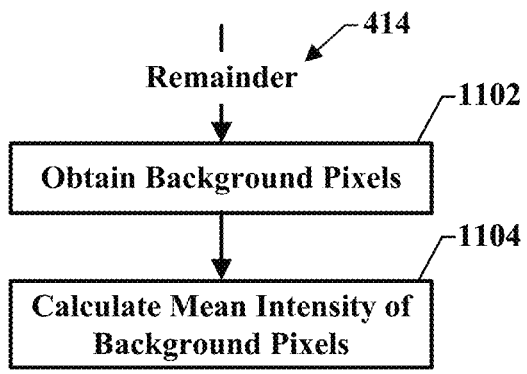
FIG. 11 shows a flow diagram of operations in an obtaining a mean value of selected background pixels, for processes in quantifying relative reflectance in systems and methods according to one or more embodiments.
Figure 12:
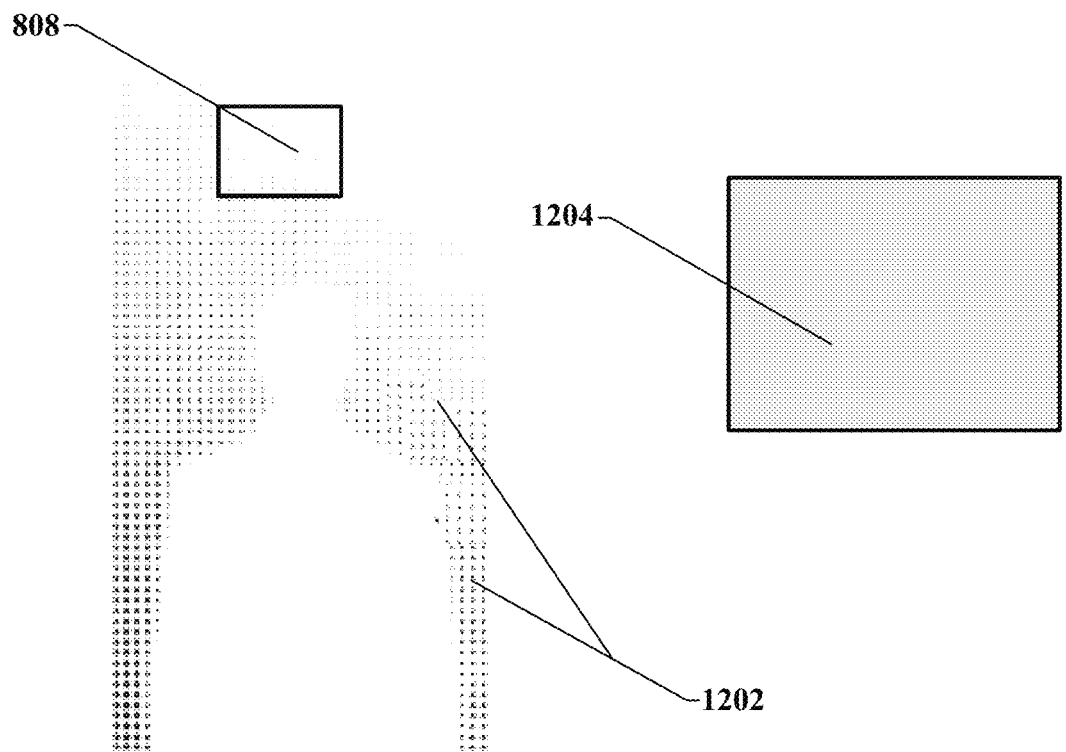
FIG. 12 illustrates examples of obtaining representative background pixels and background averaging, for processes in quantifying relative reflectance in systems and methods according to one or more embodiments.

The process 400 can then proceed to normalizing 422 the luminance of the facial skin pixels 420. The normalizing 422 the luminance of the facial skin pixels 420 produces a normalized luminance value 424 of the facial skin pixels. In an aspect, the normalizing 422 can utilize, as the normalizing reference, a mean 426 of the background pixels 408. Operations in the process 400 can therefore include computing 428 the mean 426 of the background pixels 408 for input to the normalizing 422, as shown in FIG. 4. For purposes of subsequent description, the mean 426 of the background pixels 408 will be alternatively referred to as a "first mean." As shown in FIG. 11, calculation of the first mean can include obtaining 1102 background pixels (FIG. 4, 410) from remainder pixels and calculating 1104 the mean. FIG. 12 shows a removal of the subject, leaving only background pixels 1202, and showing includes the example background region 808 identified above in reference to FIG. 8B. Area 1204 graphically depicts a mean of the background pixels, which appears as a mid-level grey.

Operations of the process 400 can proceed from the normalizing 422 the luminance values of the facial skin pixels 420 to calculating 430 the relative skin reflectance value 432, based on the normalized luminance value 424 of the facial skin pixels 420. In an implementation, the calculating 430 the relative skin reflectance value 432 can generate the relative skin reflectance value 432 as or based on a mean of the normalized luminance value 424 of the facial skin pixels 420. For purposes of subsequent description, the mean of the normalized luminance value 424 of the facial skin pixels 420 (generated within the FIG. 4 normalizing 422) will be alternatively referred to as a "second mean."

In the selecting 418 of facial skin pixels 420, operations can include calculating luminance of all the facial pixels 406. An adaptation can be a calculating a luminance of only a portion of the facial pixels 406. The portion, e.g., the number of the facial pixels 406 used for the calculating in 418 of luminances can vary based on a variety of factors. Examples of the factors can include, but are not limited to, system requirements, e.g., processing resources; operational requirements, e.g., throughput; and design preference. In embodiments substantially all the pixels are used, while in others a computing system is configured to sample pixels. Implementation of selecting, for using only a portion of the facial pixels, can be based on a variety of factors, including location (e.g., selected from a portion associated with a cheek), representative nature, their similarity/difference in comparison to other pixels and the like techniques. For example, a sampling of pixels can be used to promote computational efficiency and speed, while in other implementations a comparatively large number of pixels can be used to promote accuracy.

In an aspect, bounding can be used to eliminate extraneous portion of the face and/or adjacent or directly adjacent "non-face" pixels that are not representative of the overall or applicable skin reflectance for the face. For example, pixels associated with hair or boundary portion of the face can be eliminated because they fall outside the bounding and do not represent the overall reflectance of the of skin within the face. Bounding may be used to avoid processor use (e.g., calculation of luminescence values) that would otherwise be performed on pixels (e.g., data) that are not representative of, or tend to skew skin reflectance calculation. Systems, devices, and methods that implement other phenotypic measures can likewise benefit from use of this technique to eliminate data that is of lesser relevance than that of other data that provides a more accurate assessment of the in-question phenotypic characteristic.

In contemplated applications, faces may show various ambiguities in demarcations and boundaries between their facial pixels and background pixels, and often showing certain non-uniformities of facial skin pigmentation, a selecting 418 can be applied to facial pixels 406, to obtain facial skin pixels better representative of facial skin.

The facial portion of the image can be made up of data points (e.g., pixels) associated with values for color components, i.e., color component values that can be represented in a variety of ways, such as red, green, blue (RGB) or cyan, magenta, yellow, and black, or the like approaches for categorizing pixel color.

For example, the use of specular reflectance data for facial skin implements a sampling technique that results in the selection of pixels that are more representative of the phenomena than other facial pixels that are not.

In embodiments, devices, systems, method, steps, and approaches consistent with this disclosure are configured to account for factors impacting phenotypic characteristics, including but not limited to pixel intensity. Example factors include physical properties of the skin and underlying tissue (layers, absorbers, and scattering coefficients), physical properties of the skin surface (specular reflectance), and imaging artifacts (incident light intensity, camera gain). For example, systems and method are implemented to remove at least some imaging artifacts through post-acquisition image manipulation or by changing the conditions under which a subsequent image is captured, e.g., using a light source or a different light source and/or acquisition device, changing image capture device parameters, or the like techniques for resulting in an image with facial skin reflectance that is suitable for use, e.g., within range. Thus, a computing system can be programmed to eliminate or minimize confounding imaging artifacts effects relative to an image in which this is not done.

Optionally, non-facial pixels from a captured image, such as background pixels, can be used as a basis for correcting facial luminescence values. In examples, a sample of a background portion of an in-question image is obtained. For example, a portion of the pixels forming a background (e.g., a neutral portion of the image such as a gray wall behind the person in the image) is obtained and are processed to calculate a background pixel intensity, e.g., mean of the associated background intensities.

In an embodiment, features can include, but are not limited to, quantification of relative reflectance in captured images, reflectance threshold qualification for use in biometric identification, in combination with various adaptive, selective remediations of reflectance outside of threshold. Remediations can include, without limitation, post-processing image reflectance correction, and remediation of image capture processes.

Figure 13:
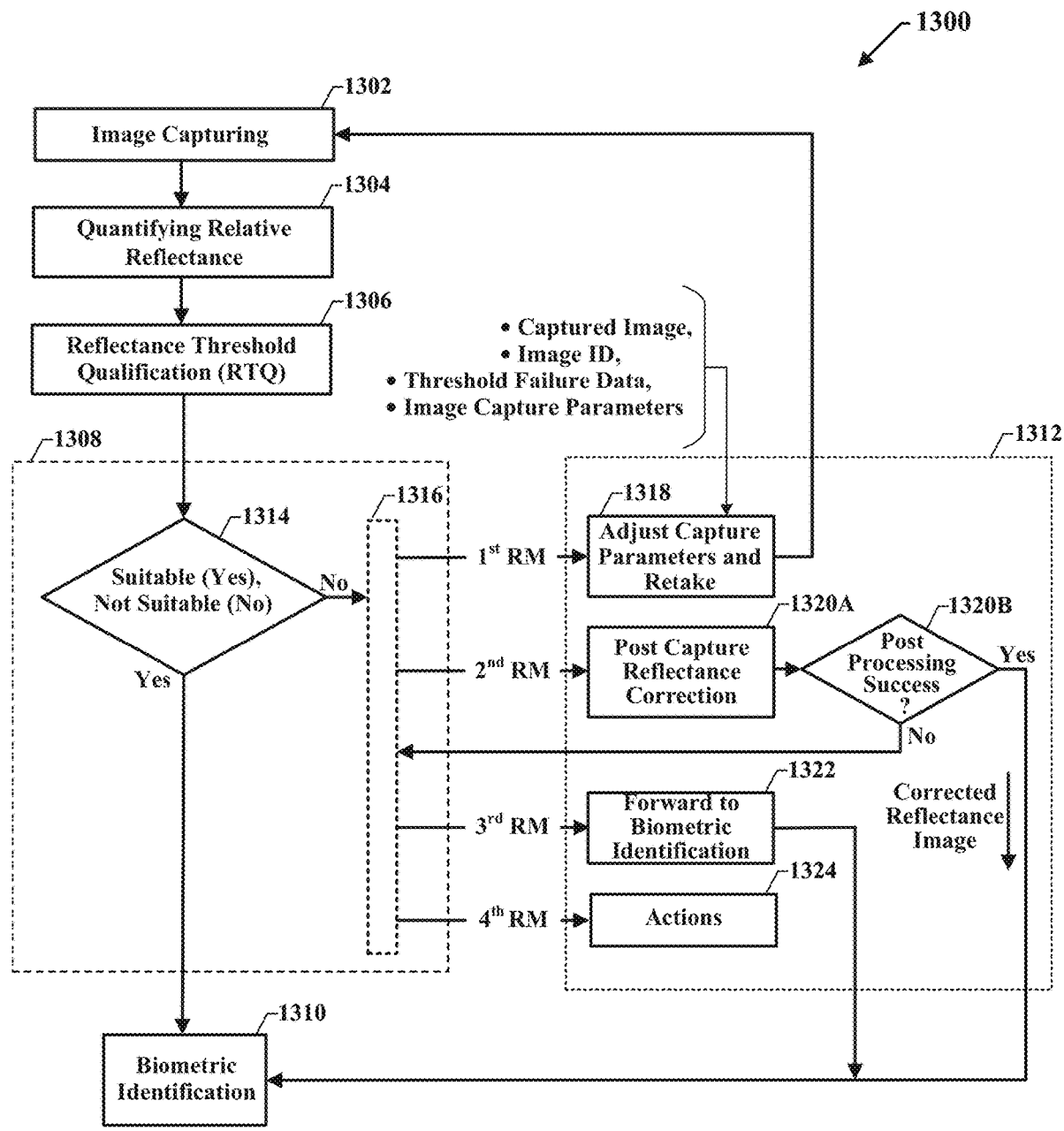
FIG. 13 shows a flow diagram of operations in a process of quantifying reflectance of captured images, with threshold qualified biometric matching and selective remediation according to one or more embodiments.

FIG. 13 shows a flow diagram of operations in a process for quantification of relative reflectance in captured images, reflectance threshold qualified biometric identification, and adaptive, selective remediations of reflectance outside of threshold. Examples will be described with reference to the system 100 shown in FIG. 1. The reference to the system 100 is not intended to limit practices in accordance with this disclosure to the system 100.

In an instance, operations in the process 1300 can include image capturing 1302. Referring to FIG. 13, image capturing 1302 can include the light source 102 illuminating, directly or via the light diffuser 112, the subject's face 110 and other surfaces of the subject 108, the background surface 106 if used, and the digital camera 104 capturing, as a captured image, the illuminated surfaces. From image capturing 1302, operations in the process 1300 can proceed to quantifying 1304 the captured image's relative reflectance. The quantifying 1304 can apply, but is not limited to, the FIG. 4 process 400 and implementations thereof, as described above in reference to FIGS. 5 through 12.

The process 1300 can proceed from quantifying 1304 the relative reflectance to reflectance threshold qualification 1306. As described above, for example, in reference to FIG. 3 reflectance threshold qualification 306, operations in reflectance threshold qualification 1306 can include comparing, to one or more thresholds, the relative reflectance value output from the quantifying 1304. The one or more thresholds can include, as described above, a ceiling threshold, or a floor threshold, or both. The reflectance threshold qualification 1306 can generate a reflectance qualification indicator, which can indicate whether the relative reflectance output from the quantifying 1304 meets the qualification threshold(s).

In accordance with one or more embodiments, operations in the process 1300 following reflectance threshold qualification 1306 can include automatic selecting 1308, as a selected next process, between a biometric identification 1310 using the received image and a remediation process 1312. The automatic selecting 1308 can be based at least in part on the indication, e.g., by reflectance qualification indicator, of whether the captured image is a suitable reflectance captured image or a not suitable reflectance captured image.

In the FIG. 13 implementation, the automatic selecting includes a binary selecting 1314 and a remediation selecting 1316. The binary selecting 1314 directs the process 1300, in response to the reflectance threshold qualification 1306 indicating a suitable reflectance, to the biometric identification 1310. The directing of the flow by the binary selecting 1314 is shown in FIG. 13 as via the block 1314 "Yes" outbranch. The binary selecting 1314 directs the flow 1300, in response to the reflectance threshold qualification 1306 indicating a suitable reflectance, to the remediation selecting 1316, shown in FIG. 13 as via the block 1314 "No" outbranch.

It will be understood that the remediation selecting 1316 can be omitted and, instead, one or more embodiments in accordance with this disclosure can provide only a fixed, single remediation option, e.g., repeat the image capture.

The FIG. 13 implementation of the remediation selecting 1316 provides selection among, in an example four different remediation processes, represented in the figure as the following four remediation paths: a first remediation process path, abbreviated on the figure as "$1^{st}$ RMD," a second remediation process path, abbreviated as "$2^{nd}$ RMD," a third remediation process path, abbreviated as "$3^{rd}$ RMD," and a fourth remediation process path, abbreviated on the figure as "$4^{th}$ RMD." It will be understood that this is only one example. One alternative implementation can provide selection among fewer than four remediation processes. Another example alternative, as described above, can provide a fixed, single remediation.

In the FIG. 13 example, the first remediation path includes an adjust capture parameters and retaking 1318, which can adjust the capture parameters and retaking the image, e.g., by returning to the image capturing 1302. As visible in FIG. 13, information input to the capture adjusting and retaking 1318 can include, in addition to the captured image, an image ID, reflectance failure data, and image capture parameters. The image ID can be, for example a temporary identifier assigned by the kiosk of FIG. 1. The image ID can include an identifier of the subject. The threshold failure data can include, for example, an identifier of which reflectance threshold was exceeded, e.g., the floor threshold, or the ceiling threshold. The threshold failure data can also include, for example, a quantification, e.g., "the reflectance was greater than 1.5 times the ceiling threshold," or "the reflectance was less than 0.8 times the floor threshold." It will be understood that "1.5" and "0.8" are arbitrary examples, not intended as any limitation. The image capture parameters can define one or more parameters used in the capture of the image that was determined by the reflectance qualification 1306 as being non-conforming. Specific examples can include, but are not necessarily limited to, one or more parameters of the lighting, one or more camera gain parameters, or one or more parameters of the light diffusion, or any combination or sub-combination thereof.

In an embodiment, the capture adjusting and retaking 1318 can be configured to use the image ID, the threshold failure data, and the image capture parameters to determine an adjustment of the image capture parameters for retaking the subject's image. In an aspect, the remediation selecting 1316, or the capture adjusting and retaking 1318, or both, can be configured to determine when no further adjustment, or at least no further adjustment having reasonable likelihood of successful result, is practical. In one example of such configuration, the determination can invoke an intervention 1324, shown in FIG. 13 as a $4^{th}$ remediation. Configuration for determining no further adjustment of capture parameters is practical can include, for example, storage of a record of iterations of the capture adjusting and retaking 1318.

In the FIG. 13 example, the second remediation path includes post capture reflectance correction 1320A, followed by post process determining 1320B of whether the post capture reflectance correction 1320A was successful. Implementations of post capture reflectance correction are described in greater detail in later sections of this disclosure. Implementation of post process determining 1320B whether the post capture reflectance correction 1320A was successful can include incorporating the post process determining 1320B in the post capture reflectance correction 1320A or can be implemented as a re-routing to the quantifying 1304.

As visible in FIG. 13, the process 1300 can proceed from a "Yes" result of the post process determining 1320B to the biometric identification 1310. As also visible, in response to a "No" result of the post process determining 1320B, the process 1300 can return to the remediation selection 1316. Operations subsequent to such a return to the remediation selection 1316 can include the $4^{th}$ remediation, identified above in this example as invoking an intervention 1324, e.g., by security personnel.

In the FIG. 13 example, the third remediation path includes an automatic forwarding 1322 to the biometric identification 1310, e.g., a fallback selecting of biometric identification, irrespective of being determined as having a non-suitable reflectance.

As stated above, the FIG. 13 four-option configuration of remediation selecting 1316 is only one example. One alternative configuration may include only one remediation. A schematic of such configuration can be constructed by omitting from the present FIG. 3 all but one of the four remediation paths and replacing remediation selecting 1316 with a direct connection of the "No" output of the binary selecting 1314 to that one remediation path. One example of such construction can be according to the following modification of FIG. 13: omit blocks 1316, 1318, 1320A, 1320B, and 1322 and directly connect the "No" out path from block 1314 to the input of intervention 1324. Another remediation selecting configuration can be a three-option configuration, e.g., by omitting the adjust capture parameters and retaking 1318, or by omitting post capture reflectance correction 1320A. Still another remediation selecting configuration can be a two-option configuration, implemented, e.g., by omitting any two of the four remediation paths described above, and adapting the remediation selecting 1316 accordingly.

Another remediation selecting configuration can include more than four remediation paths. One example can include configuring the biometric identification 1310 with a plurality, for example integer Q, different biometric matching algorithms, and configuring the remediation selecting 1316 to include a process for determining, based for example on the relative reflectance output from the quantifying 1304, whether one or the Q different biometric matching algorithms may be better suited to a captured image that, according to the current configuration of the reflectance threshold qualification 1306, is unsuitable, at least for the presently selected biometric matching algorithm. In an aspect, the process for determining whether one or the Q different biometric matching algorithms may be better suited can be configured to receive the above-described threshold failure data from the reflectance threshold qualification 1306.

It will be understood that graphical arrangement of FIG. 13 blocks is not necessarily indicative of allocation of hardware segmentation In one or more embodiments, computing and database resources for performing operations in one or more of the different blocks of the process 1300 can be separate and independent from computing resources for operations in other of the different blocks of the process 1300. Examples can include, but are not limited to, biometric identification 1310 being performed on a computing and database resources owned by a first entity, and other operations, such as post-processing reflectance correction 1320A and determining 1320B of whether the post-processing reflectance correction 1320A was successful, being performed on computing and database resources owned by a second entity. Another example, not necessarily exclusive of the first example, can include operations in the quantifying 1304 of reflectance being performed on computing and database resources owned by one entity, and operations in the capture adjusting and retaking 1318 being performed on computing and database resources owned by another entity.

Bounding can be used to eliminate extraneous portion of the face and/or adjacent or directly adjacent "non-face" pixels that are not representative of the overall or applicable skin reflectance for the face. For example, pixels associated with hair or boundary portion of the face can be eliminated because they fall outside the bounding and do not represent the overall reflectance of the of skin within the face. Bounding may be used to avoid processor use (e.g., calculation of luminescence values) that would otherwise be performed on pixels (e.g., data) that are not representative of, or tend to skew skin reflectance calculation. Systems, devices, and methods that implement other phenotypic measures can likewise benefit from use of this technique to eliminate data that is of lesser relevance than that of other data that provides a more accurate assessment of the in-question phenotypic characteristic.

In contemplated applications, faces may show various ambiguities in demarcations and boundaries between their facial pixels and background pixels, and often showing certain non-uniformities of facial skin pigmentation, a selecting 418 can be applied to facial pixels 406, to obtain facial skin pixels better representative of facial skin.

In examples, luminance values of the facial pixels are calculated from a weighted sum of associated color component values, e.g., luminance value calculation.

Facial pixels with a luminance value above a predefined upper level or below a predefined lower level can be considered as outliers that are not used. An example of a predefined upper level is 1.5 standard deviations above a mean of the set of luminance values. Facial pixels with luminance values exceeding this predefined upper level may represent features other than skin, such as irises of eyes, teeth, and eyewear, for example. An example of a predefined lower level is 1.5 standard deviations below the mean of the set of luminance values. Facial pixels with luminance values below this predefined lower level represent features other than skin, such as dark facial hair, pupils, nostrils, and oral cavities, for example. The outlier facial pixels can be discarded from the facial pixels, leaving facial skin pixels. In examples, the remaining facial skin pixels are those facial pixels that are within an upper and lower standard deviation levels for luminance values. Similar approaches can be used for other phenotypes or covariates with the applicable standard deviation being set based on the applied phenotypic property implemented in the method.

The facial portion of the image can be made up of data points (e.g., pixels) associated with values for color components, i.e., color component values that can be represented in a variety of ways, such as red, green, blue (RGB) or cyan, magenta, yellow, and black, or the like approaches for categorizing pixel color.

For example, the use of specular reflectance data for facial skin implements a sampling technique that results in the selection of pixels that are more representative of the phenomena than other facial pixels that are not.

In embodiments, devices, systems, method, steps, and approaches consistent with this disclosure are configured to account for factors impacting phenotypic characteristics, including but not limited to pixel intensity. Example factors include physical properties of the skin and underlying tissue (layers, absorbers, and scattering coefficients), physical properties of the skin surface (specular reflectance), and imaging artifacts (incident light intensity, camera gain). For example, systems and method are implemented to remove at least some imaging artifacts through post-acquisition image manipulation or by changing the conditions under which a subsequent image is captured, e.g., using a light source or a different light source and/or acquisition device, changing image capture device parameters, or the like techniques for resulting in an image with facial skin reflectance that is suitable for use, e.g., within range. Thus, a computing system can be programmed to eliminate or minimize confounding imaging artifacts effects relative to an image in which this is not done.

Optionally, non-facial pixels from a captured image, such as background pixels, can be used as a basis for correcting facial luminescence values. In examples, a sample of a background portion of an in-question image is obtained. For example, a portion of the pixels forming a background (e.g., a neutral portion of the image such as a gray wall behind the person in the image) is obtained and are processed to calculate a background pixel intensity, e.g., mean of the associated background intensities.

Figure 14:
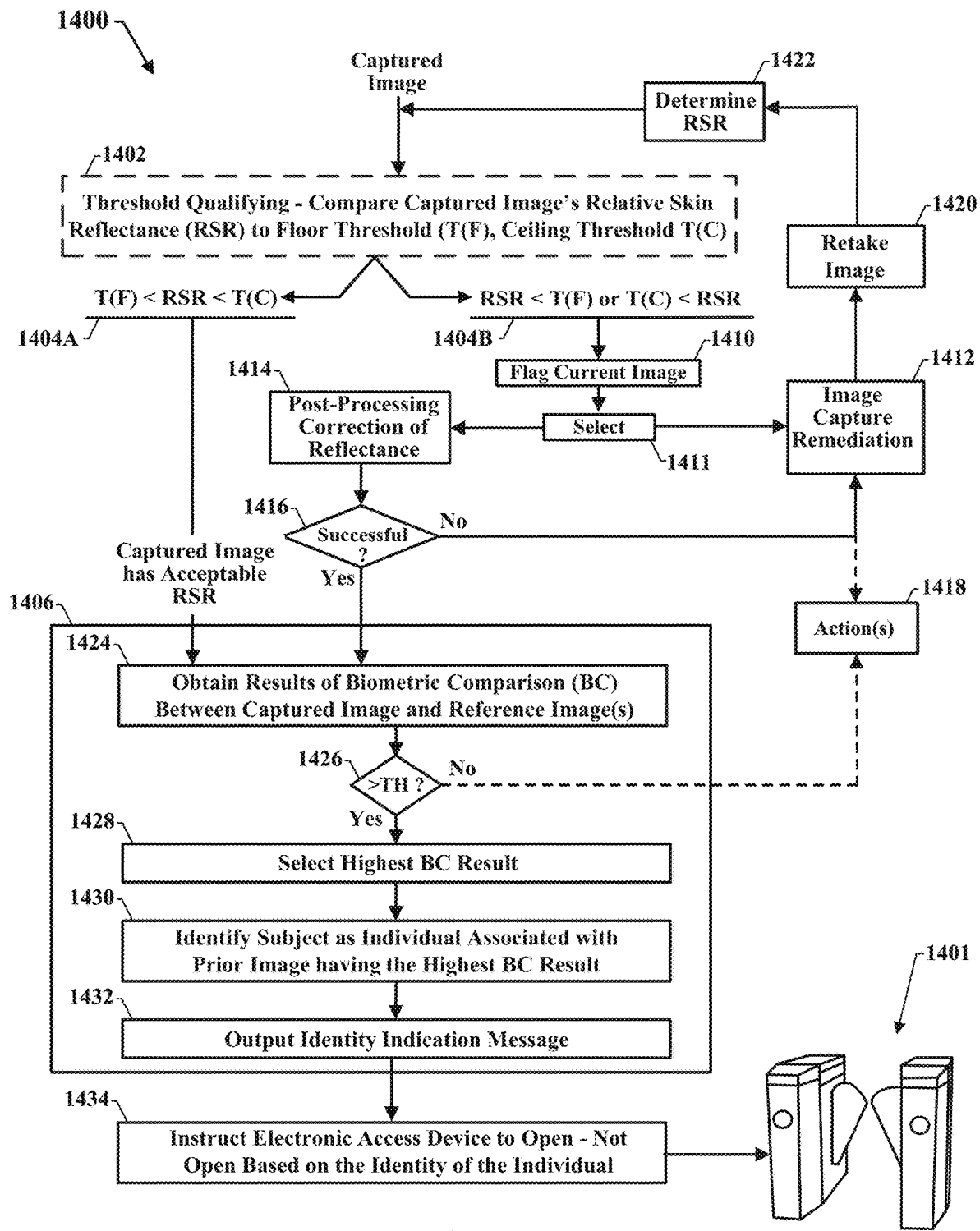
FIG. 14 shows a flow diagram of operations in a process of biometric identification and access control, with image reflectiveness thresholding, in systems and methods according to one or more embodiments.

FIG. 14 shows a flow diagram of operations in a process 1400 of biometric identification and access control, with image relative reflectance thresholding according to one or more embodiments. Description assumes an electronically actuated access control device 1401, e.g., e-gate. The electronically actuated access control device 1401 can be, for example, a "man trap." Description assumes as input a captured image and a relative skin reflectance (RSR) of the captured image. The captured image can be received, for example, from the digital camera 104 of the FIG. 1 system 100. The RSR can be received, for example, from an implementation of the FIG. 3 quantifying 304 of relative reflectance.

Operations in process 1400 can include threshold RSR qualification 1402, which can apply RSR against, for example, a ceiling threshold T(C) and a floor threshold T(F). Threshold RSR qualification 1402 can indicate suitability 1404A of the captured image if RSR is within the suitable range, e.g., meets T(C) and T(F), and can indicate non-suitability 1404B of the captured image if RSR value is not within the suitable range, e.g., does not meet one of T(C) and T(F). The T(C) and T(F) values may be pre-determined. In embodiments T(C) and T(F) may be updated, dynamically or a periodically, for example, based on current selection of biometric algorithms, or on a dynamic updating to adjust a likelihood that facial recognition will lead to an inconclusive result.

In response to the threshold RSR qualification 1402 indicating suitability 1404A of the captured image, the process 1400 proceeds to biometric identifying 1406. Based at least in part on a result of the biometric identifying 1406 the process 1400 can then instruct 1408 the electronically actuated access control device 1401 to perform an access control action. The electronically actuated access control device 1401 can be, for example, a gate or a turnstile, and the instruction 1408 can instruct the device 1401 to open, close, stay open, stay closed, or the like.

In response to the threshold RSR qualification 1402 indicating non-suitability 1404B of the captured image, the process 1400 can proceed to flagging 1410 the current captured image for a follow on action, for example, a selection 1411 between image capture remediation 1412 and applying a post processing correction 1414 to the captured image. The post processing correction 1414 can include image processing configured to generate, from the captured image, a corrected reflectance image, having an RSR suitable for biometric identifying 1406. The process 1400 can include a determining 1416 of whether the post processing correction 1414 is successful. The process 1400 can include, for instances where the determining 1416 is a negative, a routing to either an action 1418 or the image capture remediation 1412. Selection logic for selecting between the action 1418 and the image capture remediation 1412 can be provided. The process 1400 can include with the image capture remediation 1412 a generation of updated or adjustive image capture parameters, and a retaking 1420 of the image of the subject to obtain a second captured image. The process 1400 can also include, for the second captured image a determining 1422 of the relative reflectance of the second captured, followed by return to the threshold RSR qualification 1402.

In the FIG. 14 configuration, biometric identifying 1406 can include obtaining results 1424 of biometric comparison (BC) between the captured image and reference image(s). The biometric comparison can be configured as a one-to-one comparison between the captured image of a subject and a single reference image of the subject (also referred to as 1:1 matching). Regarding the reference image, in one or more embodiments, the reference image can be retrieved from an identification credential such as a driver's license. In another embodiment, the reference image can be retrieved from an electronic credential such as a mobile driver's license (mDL). In another embodiment the electronic credential can be provisioned to a mobile device such as a smartphone or the like. It will be understood that the above-identified examples are not exhaustive and are not mutually exclusive.

For example, one or more embodiments can retrieve the credential, or multiple credentials of a subject, from a driver's license, an mDL, or other sources. In embodiments, metadata related to the reference image in such a credential can be communicated as well to serve as a basis for informing the system performing the identification of conditions associated with acquisition of the reference image.

Operations in obtaining 1424 results of biometric comparison between the captured image and reference image(s) can include a one-to-many (1:N matching) comparison. The 1:N comparison can be, for example, between the captured image and reference images retrieved from an image gallery. In such implementation, operations can include flagging 1410 whether the captured image matches any of the reference images gallery to a sufficient standard, e.g., a matching threshold. Operations associated with the 1:N matching can also include determining a match, when 1:N matching is performed between the captured image and an image gallery. The results of the biometric comparisons are obtained (biometric matching).

When the result or results of the biometric comparison exceeds a matching threshold TH, the process 1400 may deem a match was made and, as indicated by the "Yes" output of branch 1426, can proceed to a selecting 1428. In an example of 1:N matching, selecting 1428 can be the highest-scoring biometric match, and the process 1400 can proceed to 1430, identify the subject as the individual associated with the gallery image having the highest biometric matching result, and then to outputting 1432 an identification message.

Referring to the comparison at 1424, in implementations using 1:1 matching, when the biometric comparison result exceeds the matching threshold TH, the subject is identified as the individual associated with the asserted identity and process 1400 can proceed directly to outputting 1432 the identity indication message indicating the identity of the subject.

In an embodiment, the process 1400 can include generating 1434, based at least in part on a result of the biometric identification 1406, an instruction to the electronically actuated access control device 1401, e.g., an access control message, instructing the device 1401 to either open, or stay open, or to close or stay closed. The instruction can be generated, for example, as an access control signal, having a value set between an access open value and an access closed value.

One or more embodiments can include image capture remediation that can include but is not limited to calculating adjustments to the image capture process to re-take the image, i.e., obtain a second captured image of the subject, having a likelihood of having a suitable reflectance. Further features can include, for example by machine learning, general adjustments to the image capturing process that, for all subjects or for certain ages, genders and so forth of subjects, are likely to obtain a higher percentage of captured images showing suitable reflectance.

Figure 15:
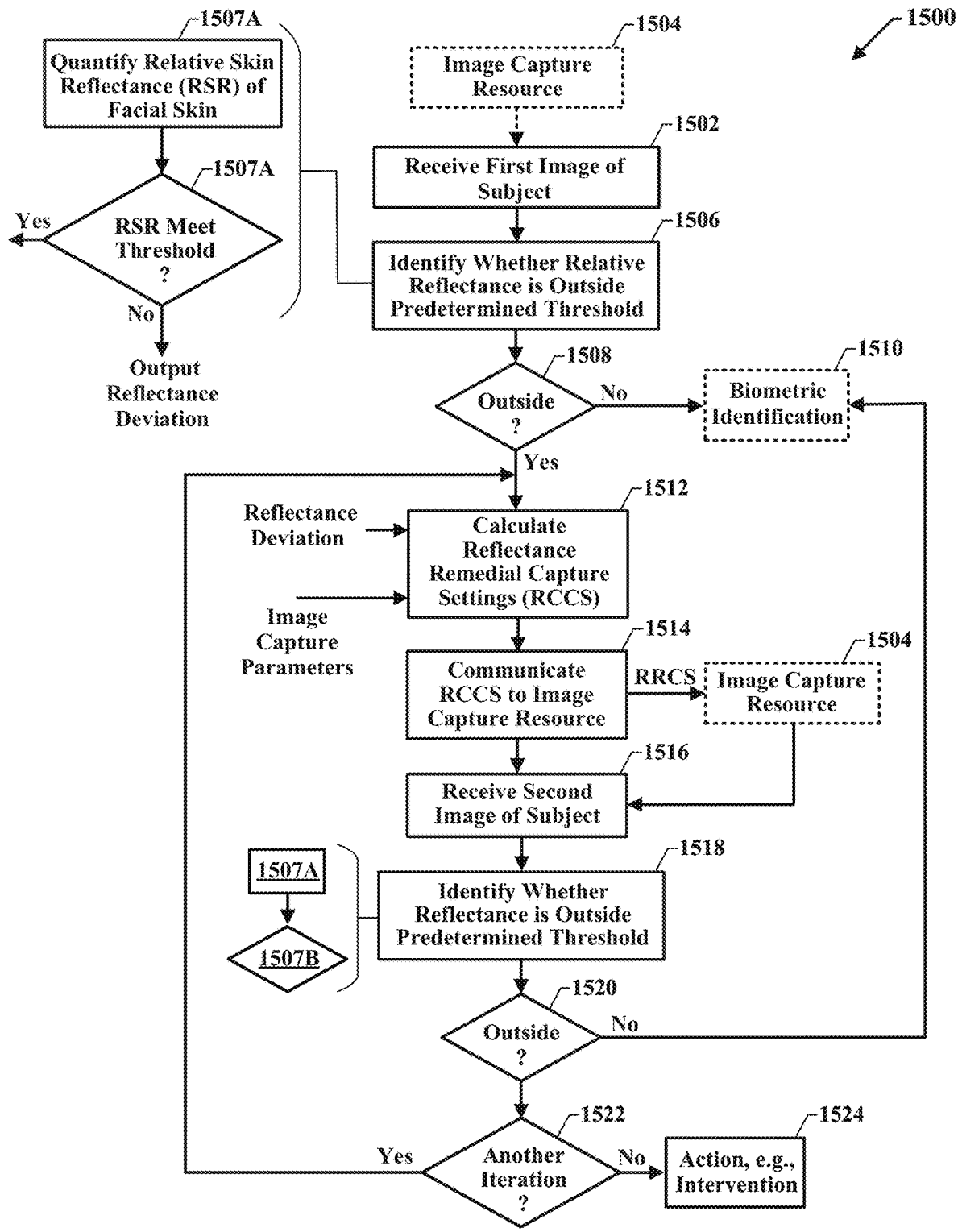
FIG. 15 shows a flow diagram of operations in a process of quantifying reflectance of captured images and of remediating image capture according to one or more embodiments.
Figure 16:
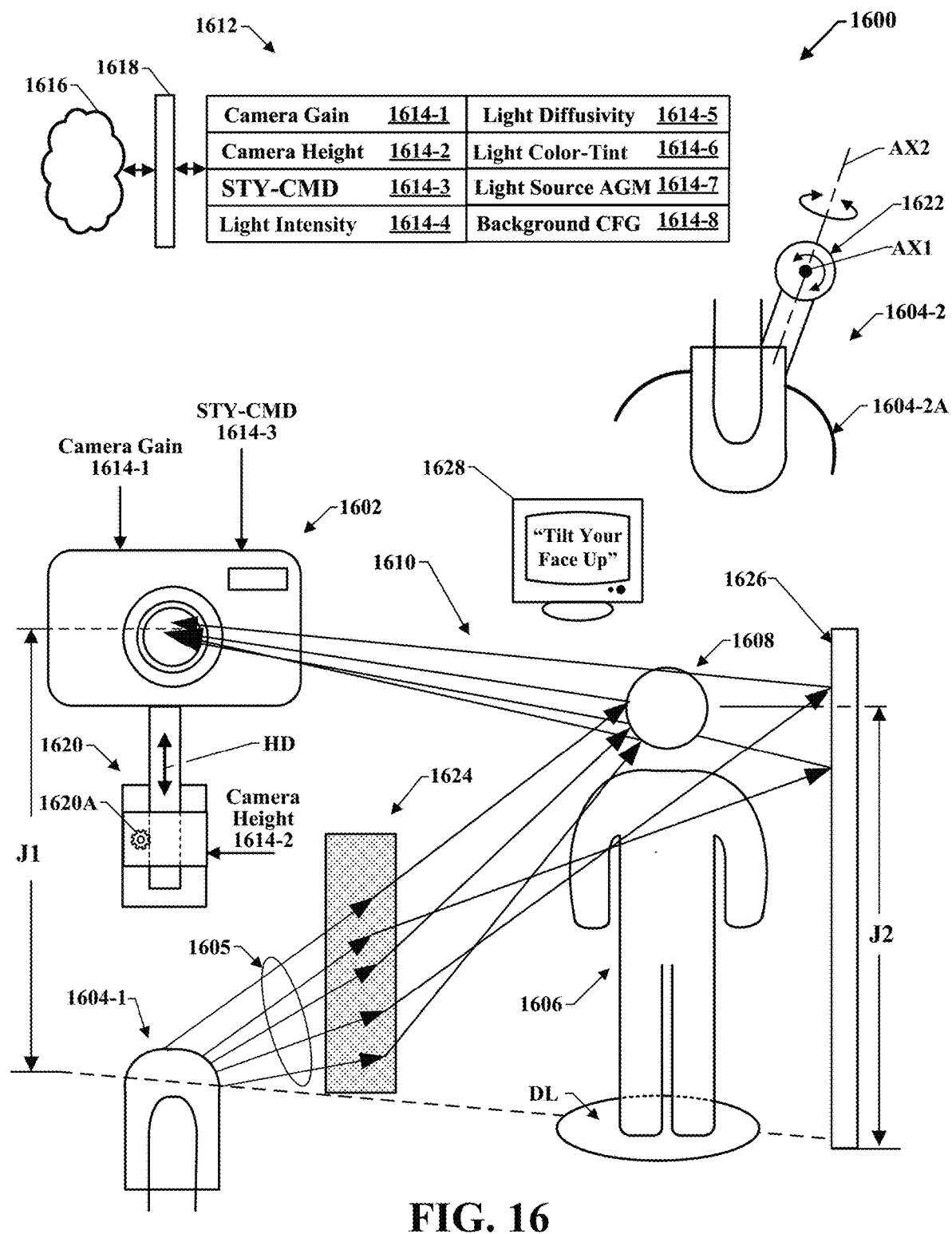
FIG. 16 illustrates an example operating environment for capture of images in accordance with one or more embodiments.

FIG. 15 illustrates a flow diagram of operations in a process 1500 of skin reflectance correction in biometric image capture in accordance with one or more embodiments. Operations in the process 1500 can include receiving 1502 a first captured image of a subject, from an image capturing resource 1504. In an embodiment image capturing resource 1504 can be configured according to the FIG. 16 system 1600. Referring to FIG. 16, an implementation of the system 1600 can include a digital camera 1602 and one or more light sources such as the example first light source 1604-1 and second light source 1604-2 (hereinafter collectively "light sources 1604"). The light sources 1604 can be at respective positions relative to a position DL where a subject 1606 may stand or sit for image capture. In an image capture, the light sources 1604 may illuminate skin surfaces of the subject's face 1608 and other surfaces, portions of the light are reflected back as reflection rays 1610, which are captured by the digital camera 1602 to form a captured image. It will be understood that the FIG. 16 population of two light sources 1604 is neither a limitation nor an indication of preference. Implementations of system 1600 can include more than two light sources 1604 and can include a single light source 1604. In implementations with a plurality of light sources 1604, one or more of the light sources 1604 can be of one type, and one or more of the light sources 1604 can be among one or more other types. The light sources 1604 can be continuous light sources or can be flash sources or can be a mixture of continuous and flash.

In various embodiments, the system 1600 can include an image capture parameter storage 1612, configured to store one or more image capture parameter values, generated by processes such as process 1500. Examples shown in the FIG. 16 implementation, collectively referenced for purposes of description as "image capture parameter values 1614," include camera gain 1614-1; camera height 1614-2; camera spectral sensitivity (abbreviated "STY-CMD" in the FIG. 1614-3; lighting intensity 1614-4, light diffusivity 1614-5, lighting color-tint 1614-6, light source arrangement (abbreviated "Light Source AGM" in the FIG. 1614-7, and background configuration (abbreviated "CFG" in the FIG. 1614-8. It will be understood that the FIG. 16 population and configuration of image capture parameter values 1614 is only an example. Embodiments can omit one or more of the specific examples shown in FIG. 16. Embodiments can include a larger population of image capture parameter values 1614 than included in the FIG. 16 example values of the image capture parameter values 1614. In an aspect, one or more of the example image capture parameter values 1614 shown in FIG. 16 can be separated into a vector-like, multi-valued parameter that can provide, for example, a finer granularity to adjustments to the image capture process.

It will also be understood that the image capture parameter storage 1612 is a logic resource and not necessarily implemented as a separate, discrete hardware. For example, portions of image capture parameter storage 1612 can be provided by local storage resources of the system 1600 components, e.g., parameter storage feature of the digital camera 1602, light emitting diode (LED) palette command storage of LED implementation of one or more of the light sources 1604.

In an aspect, the system 1600 can include a logic interface of the image capture parameter storage 1612 with resources supporting processes according to various embodiments for calculating reflectance correcting image capture parameters, e.g., the FIG. 15 process 1500 and other processes described in greater detail in later sections of this disclosure. FIG. 16 shows, as one example of such interface, a generic logic network 1616 and a logic network interface 1618. The generic logic network 1616 and logic network interface 1618 will be understood to be a logic coupling, having no limitation as to hardware. The generic logic network 1616 and logic network interface 1618 can encompass, for example, communication between operations of image capture, e.g., and operations of reflectance correcting image capture parameter calculation can be local to, and even integrated or otherwise shared at least in part with, hardware of system 1600.

The system 1600 can include a height adjustable camera support 1620 for the digital camera 1602. The height adjustable camera support 1620 can provide, for example, via a reversible actuator gear 1620A movement along a height axis HD, to adjust a height J1 of the digital camera 1602. The height J1 may be controlled by the camera height 1614-2 among the reflectance correcting image capture parameter values 1614. The height J1 can be relative to a floor surface FS that can be, for example, a reference for height J2 of the face 1608 of the subject 1606. The system 1600 can also provide the digital camera 1602 with the camera gain 1614-1 and camera spectral sensitivity 1614-3. It will be understood that "provide," in the context of providing image capture parameters to components and functionalities of the system 1600, can include translating the parameter values to a format or protocol appropriate for the components and functionalities.

The FIG. 16 population of two light sources 1604 is neither a limitation nor an indication of preference. Implementations of system 1600 can include more than two light sources 1604 and can include a single light source 1604. In implementations with two or more light sources 1604, one or more of the light sources 1604 can be of one type, and one or more of the light sources 1604 can be of another, or from among a plurality of other types.

In an implementation, one or more of the light sources 1604 can include a pivotable support, such as the example pivotable light support 1622 supporting the second light source 1604-16. The pivotable light support(s) 1622 can be controlled, for example, by the light source arrangement parameter value 1614-6, or by an additional image capture parameter value 1614. The pivotable light support 1622 is shown, for purposes of example, as pivotable about a first pivot axis AX1 and about a second pivot axis AX2. Control of one or more of the light sources 1604, particularly ones such as the second light source 1604 that are on a pivotable light support, can include a focusing reflector 1604-2A.

One or more of the light sources 1604 can include light intensity controllability that can be set, for example, by the lighting intensity 1614-4 parameter.

The system 1600 can include a light diffuser 1624, controllable for example by the light diffusivity 1614-5 image capture parameter, between at least one of the light sources 1604 and the subject 1604. The light diffuser 1624, if used, may be implemented by an adjustable light diffusion apparatus, e.g., a commercial off-the-shelf (COTS) adjustable diffuser such as available from various vendors. The FIG. 16 configuration of the light diffuser 1624 is only an example. One example alternative can include, but is not limited to, an incorporation of the light diffuser 1624 or equivalent into, for example, a projection lens of the first light source 1604-1. Another alternative can include, but is not limited to, incorporating a first instance of light diffuser 1624 or equivalent into a projection lens of one among the light sources 1604 and positioning another, non-incorporated light diffuser between the subject 1606 and another of the light sources 1604.

One or more of the light sources 1604 can be implemented as an LED color adjustable light, either continuous or flash. Color adjustment can be controlled, for example, by the lighting color-tint 1614-5.

In one or more embodiments, the light source arrangement parameter 1614-6 can be configured to incorporate, for example, one or more of the other image capture parameter values 1614, for example, one or both of the light intensity 1614-4 and the light diffusivity 1614-5. In one example implementation the light source arrangement parameter 1614-6 can be configured as a selector, for selecting among, for example, up to integer LQ different light source arrangements. One adaptation includes with the light source arrangement parameter 1614-6 one or more lighting component specific parameters, e.g., a pointing direction for the pivotable light support 1622.

Corresponding to and controlled by the background configuration 1614-7, the system 1600 can include, in an embodiment, a background surface 1626.

Implementations of the system 1600 can also include, for example, a display 1628 to present the subject 1606 with prompts, suggesting to the subject 1606 an adjustment of stance or posture. In the example visible in FIG. 16, the prompt is a suggestion for rotating or tilting of the subject's face 1608, to an orientation that is deemed likely to provide, from an image capture, a captured image with a suitable reflectance.

The light sources 1604 are not necessarily a system 1600 dedicated resource. For example, system 1600 can utilize, or can be switchably configured to utilize, ambient light as one or more of the light sources 1604.

In an embodiment, system 1600 can include an illumination source or plurality of information sources that are outside the visible light spectrum, e.g., ultraviolet (UV) light. The feature can be included as a supplement or as an alternative to visible light. In another adaptation, the system 1600 can use, instead of or in addition to the digital camera 1602, an image capture device other than a camera.

Referring to FIG. 15, and continuing with description of the process 1500, upon receiving 1502 from the image capture resource 1504 the first captured image of the subject (e.g., subject 1606 shown in system 1600) the process 1500 can proceed to identifying 1506 whether the captured image's relative reflectance is outside of a reflectance threshold. The identifying 1506 can be implemented as quantifying 1507A of the relative skin reflectance (RSR) of facial skin regions of the captured image, followed by comparing 1507B the RSR to the threshold. Based at least in part on the result of the comparing 1507B being "Yes," a determination at 1508 is "No," the relative reflectance is not outside of the threshold, and the process 1500 proceeds to biometric identification 1510. The biometric identification 1510 and other operations in the process 1500 can be performed, for example, on shared computational resources or can be performed on separate computational resources, as indicated by the dotted line graphics representing biometric identification 1510.

Regarding the reflectance threshold applied by the comparing 1507B, implementations can include, as described above, a floor threshold, or a ceiling threshold, or can include both.

Referring again to the comparing 1507B, based at least in part on the result being "No," the determination at 1508 is "Yes," the relative reflectance is outside of the threshold, and the process 1500 proceeds to calculating 1512 reflectance correcting capture settings, which for brevity is also recited herein by the abbreviation "RCCS." In an embodiment, operations in the comparing 1507B can provide, e.g., for input to the RCCS calculation 1512, data regarding the deviation of the relative reflectance from the threshold. For purposes of description the data will be referenced as "output reflectance deviation data." The output reflectance deviation data can include, for example, an arithmetic value or other characterization of the relative reflectance obtained by the quantifying 1507A. The output reflectance deviation data can also include, or the RCCS calculation 1512 can otherwise obtain, the current threshold that was applied by the comparing 1507B. It will be understood that "RCCS," as used in this disclosure, does not have or import intrinsic meaning; it is an abbreviation for reading convenience.

In an embodiment, input to the RCCS calculation 1512 can also include data characterizing the applied image capture settings used in capturing the image determined by the comparing 1507B as not meeting the thresholds. It will be understood by persons of ordinary skill in the relevant arts, upon reading this disclosure in its entirety, that implementation of providing the applied image capture settings to the RCCS calculation 1512 can be, at least in part, application-specific.

Upon completing RCCS calculation 1512 the process 1500 can proceed to communicating 1514 the RCCS to the image capture resource. Specific implementation of the communicating 1514, as described above for providing applied image capture settings to the RCCS calculation 1512, can depend at least in part on respective sharing or independence of computational resources between the process 1500 and the image capturing. Examples are described in greater detail in later sections of this disclosure.

After some duration of time, the process 1500 can receive 1516 from the image capture resource a second captured image of the subject. The process 1500, in response, can proceed to identifying 1518 whether the reflectance of the second captured image meets the reflectance thresholds. Operations in the identifying 1518 can be another instance of the quantifying 1507A and comparing 1507B described above. Thresholds applied in this instance of the comparing 1507B can be identical to the thresholds applied to the first captured image. In an embodiment, thresholds applied to the second captured image can differ from thresholds applied to the first captured image. For example, and without limitation the process 1500 may be adapted to include, e.g., in association with RCCS calculation 1512 for the first captured image, communication with the biometric identification. In contemplated implementations in accordance with this disclosure, such communication can produce a selecting of an updated biometric algorithm. Based at least in part on the updated biometric algorithm, threshold applied by the comparing 1507B to the second captured image may differ from threshold applied to the first captured image.

Process 1500 flow after identifying 1518 whether the second captured image is outside of threshold depends at least in part on a result of said identifying. In response to a negative result, i.e., the identifying 1518 indicating the relative reflectance of the second captured image is not outside the threshold, the process 1500 can proceed from the "No" outbranch of decision 1520 to the biometric identification 1510. In response to a positive result at 1518, i.e., determining the reflectance of the second captured image is outside the threshold, the process 1500 can first proceed from the "Yes" outbranch of decision 1520 to an iteration decision 1522 of whether to perform another iteration of image capture. Logic specifications of the iteration decision 1522 can be application specific. Factors can include, for example and without limitation, whether this will be the first repeat iteration, tolerance to delays and reduction in biometric identification throughput that may result from the iterations, as well as burden on security personnel of resolution by intervention. Another factor can be the reflectance deviation.

Assuming the iteration decision at 1522 is "Yes," i.e., repeat another iteration, the process can return to RRCS calculation 1512 as described above. If the iteration decision 1522 is "No," i.e., not to repeat another iteration, the process 1500 can proceed, for example, to action 1524, e.g., an intervention. Alternatively, the process 1500 can be configured such that, in place of action 1524, the process proceeds to biometric identification 1510, irrespective of the captured image's reflectance.

In embodiments, a system or device (e.g., an image capture device) is configured to capture multiple images so more than one image is available for skin reflectance analysis. In such embodiments, a system response to a first image being out of tolerance for skin reflectance can be to analyze another of the multiple images to determine if the other image is within tolerance and/or can be enhanced to be in tolerance. The system, in other words, can be configured to iterate through images to obtain an image that is or can be enhanced to be suitable for biometric matching/identification. These additional images may have been captured contemporaneously or substantially contemporaneously with the initial image examined for skin reflectance suitability.

In some embodiments, systems include a variety of components that can be operated in various configurations under control of the computing system to select among various imaging devices, light sources, biometric matching/identification algorithms and parameters. This can be done based on analysis of the phenotypic information implemented by the computing resource. For example, the system, in response to determining an image is unsuitable for biometric matching, can implement the various components to perform in a manner that is comparatively more likely to result in acquisition of a suitable image. For example, in response to determining a captured image in the visible spectrum is not suitable, the system can implement a combination of one or more of an infrared light source, infrared camera and/or a biometric algorithm that are configured for use with infrared based imaging. Other techniques as understood by one of ordinary skill in the art can be implemented as well to increase the likelihood of obtaining a suitable image. For example, the system may output prompts for the subject to increase the likelihood that the subject is in an orientation that is more likely to result in acquisition of a suitable image.

Computer System

Figure 17:
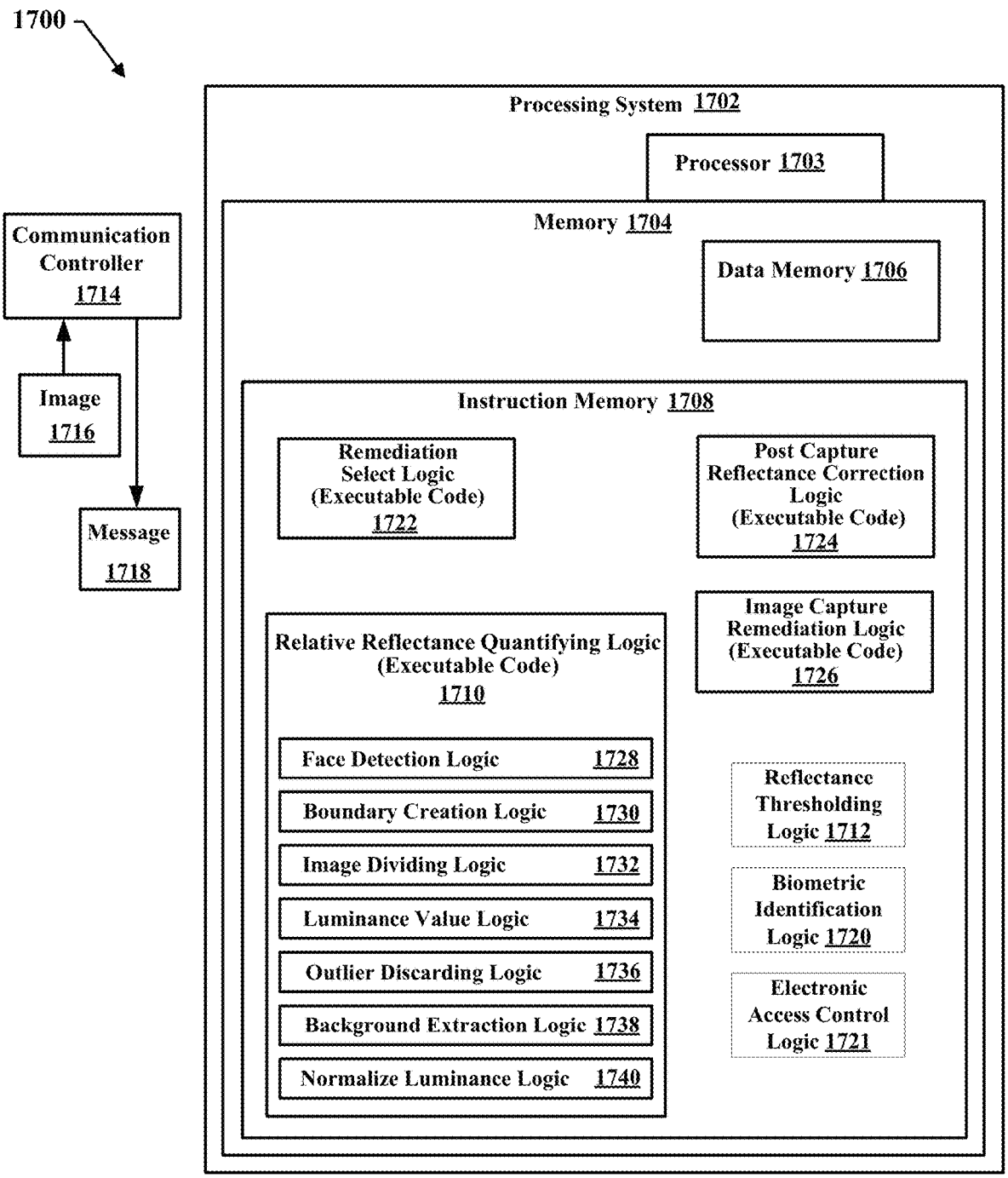
FIG. 17 illustrates, in simplified schematic form, a computing system on which aspects of the present disclosure can be practiced.

FIG. 17 illustrates, in simplified schematic form a computer system 1702 on which aspects of the present disclosure can be practiced. The computer system 1702 can include a hardware processor 1703 communicatively coupled to a memory 1704. The memory 1704 can include a data memory 1706 and an instruction memory 1708. Coupling of the hardware processor 1703 to the memory 1704 can be provided by a bus. It will be understood that the memory 1704 can be a distributed resource, with portions coupled to the hardware processor 1703 by local bus, local network (LAN), or a wide area network (WAN), or combination of a local bus, LAN and WAN. It will be understood that the data memory 1706 and instruction memory 1708 are logic functions and not necessarily discrete hardware; e.g., they can be respectively assigned or allocated portions of a shared memory resource.

The instruction memory 1708 can be configured to store, on at least a non-transitory computer readable medium as described in greater detail below, executable program code. The executable program code can be configured, in a logic sense, as modules that, when executed by the hardware processor 1703 can configure the hardware processor 1703 into a logic. The hardware processor 1703 may include multiple hardware processors and/or multiple processor cores. The hardware processor 1703 may include hardware processors from different devices that cooperate.

Relationship Between Hardware Processor and Executable Program Code

The relationship between the executable program code stored in the instruction memory 1708 and the hardware processor 1703 is structural; the executable program code is provided to the hardware processor 1703 by imparting various voltages at certain times across certain electrical connections, in accordance with binary values in the executable program code to cause the hardware processor 1703 to perform some action, as now explained in more detail.

The executable program code can comprise a sequence of instructions that when executed by the computer system 1702 cause it to be configured in a manner consistent with this disclosure and operate as described herein.

For example, the instruction memory 1708 can store a reflectance executable code 1710 that when executed by the hardware processor 1703 can cause the processor to perform operations for quantifying the relative reflectance of a captured image, including but not limited to operations and functionalities described in reference to the FIG. 3 process 300 quantifying 304 or the FIG. 4 process 400 quantifying the captured image's relative reflectance. The relative reflectance executable code 1710 is therefore alternatively referred to, and labeled accordingly on FIG. 17, as "relative reflectance quantifying logic" 1710. As visible in FIG. 17, the relative reflectance quantifying logic 1710 can include component blocks or modules of executable code, respectively implementing component logic blocks that will be described in greater detail in subsequent paragraphs.

The executable program code stored in the instruction memory 1708 can also include reflectance thresholding executable code 1712 that when executed by the hardware processor 1703 can cause the processor to perform operations that include comparing the relative reflectance of a captured image, e.g., the relative reflectance generated by the relative reflectance quantifying logic 1710, against one or more thresholds and generating, based on a comparing against one or more thresholds, an indication of the captured image being suitable or not suitable for biometric identification. Such operations and functionalities as described above can include but are not limited to operations and functionalities described in reference to the FIG. 3 reflectance threshold qualification 306. The reflectance thresholding executable code 1712 is therefore alternatively referred to, and labeled accordingly on FIG. 17, as "reflectance thresholding logic" 1712.

For brevity, other component blocks or modules of computer-executable instructions will be referenced as "logic," as each includes code that when executed by the hardware processor 1703, can cause the processor to perform and provide functionalities of a particular logic.

The computing system 1700 can also include a communication controller 1714 that can be under control of the processing system 1702 and can be adapted to receive an image 1716. The image 1716 can be a captured image of a subject, such as a captured image received from the FIG. 1 digital camera 104. The communication controller 1714 can also be configured to provide the received image 1716 to the computer system 1702 for storage. The storage can be, for example, in the data memory 1706 for further processing, e.g., by the relative reflectance quantifying logic 1710, for processes according to embodiments.

Executable program code stored in the instruction memory 1708 can also include biometric identifying logic 1720 that when executed by the hardware processor 1703 can cause the processor to perform logic functions of a matching between the captured image and a set or gallery of reference images such as a set of images in an image gallery. The biometric identifying logic 1720 an be configured to cause the hardware processor 1703 to perform the biometric matching in response to indication, for example, by logic components within the relative reflectance quantifying logic 1710 and described in greater detail later, that the relative skin reflectance value of the captured image is within the suitable range of relative skin reflectance values. In an embodiment, the biometric identifying logic 1720 can be adapted to output, by the communication controller 1714 as a message 1718, an identification message identifying the subject. Referring to FIG. 14, an example identification message can be an output identity indication message 1432 indicating the subject as the individual associated with the gallery image that matches the captured image with the highest biometric comparison. In an aspect the biometric identifying logic 1720 outputs a access control message that, directly or through an electronic access control logic 1721, can be communicated to an electronic access control device, e.g., the FIG. 13 electronically actuated access control device 1401. The signal, or command signal from the electronic access control logic 1721, can cause operation of the electromechanical device, e.g., the electronically actuated access control device 1401, such as causing the device or another gate or other physical access control device to open.

In other examples, the hardware processor 1703 can output, e.g., based on a biometric matching indication from the biometric identifying logic 1720, an electronic indication associated with the (now matched) identity. Examples include displaying a yes/no or an "x" or checkmark on a communicatively coupled electronic display to indicate whether the subject is to be permitted or denied, e.g., proceed to a testing center or secured area such as a sterile security environment.

It will be understood that the above-described example features and operations of the biometric identifying logic 1720 can implement or can be components of an implementation of the FIG. 3 biometric identification 310, can implement or can be components of an implementation of the FIG. 13 biometric identification 1310.

Executable program code stored in the instruction memory 1708 can include remediation select logic 1722 and can include post capture reflection correction logic 1724. Executable program code stored in the instruction memory 1708 can include image capture remediation logic 1726. The remediation select logic 1722 can be configured to cause, when executed by the hardware processor 1703, the processor to perform and provide functionalities including but are not limited to operations and functionalities described in reference to the FIG. 13 binary selecting 1314 and the remediation selecting 1316. The post capture reflection correction logic 1724, when executed by the hardware processor 1703, can cause the processor to perform and provide functionalities including but are not limited to operations and functionalities described in reference to the FIG. 13 post capture reflection correction 1320A and corresponding post processing determining 320B. The image capture remediation logic 1726, when executed by the hardware processor 1703, can cause the processor to perform and provide functionalities including but are not limited to operations and functionalities described in reference to the FIG. 3 image capture parameters adjust and retaking 1318.

As described above, the relative reflectance quantifying logic 1710 can include component logic. In the FIG. 17 configuration, component logic of the relative reflectance quantifying logic 1710 can include face detection logic 1728, boundary creation logic 1730, and image dividing logic 1732. Configured as shown in FIG. 17, component logic of the relative reflectance quantifying logic 1710 can also include luminance value logic 1734, outlier discarding logic 1736, background extraction logic 1738, and normalize luminance logic 1740.

The face detection logic 1728, when executed by the hardware processor 1703, can cause the processor to perform operations and provide functionalities including, but not limited to, operations and functionalities described in reference to the FIG. 3 face detecting 410. Such operations and functionalities can include but are not limited to the three-rectangle feature operations described in reference to FIG. 9. The boundary creation logic 1730, when executed by the hardware processor 1703, can cause the processor to perform and provide functionalities including but not limited to operations and functionalities described in reference to the FIG. 6 creating 602 a boundary around the detected face region. The image dividing logic 1732, when executed by the hardware processor 1703, can cause the processor to perform and provide functionalities including but not limited to operations and functionalities described in reference to the FIG. 7 dividing 604 of an image into facial pixels 406 and remainder pixels 414.

Referring to FIG. 17, the luminance value logic 1734, when executed by the hardware processor 1703, can cause the processor to calculate a luminance value for at least some of the facial pixels within the boundary, e.g., the mask 802 boundary described in reference to FIG. 8A. The calculations can be an implementation, for example, of the FIG. 9 calculating 902 of luminance values. In some embodiments, the luminance value logic 1734 can cause the hardware processor 1703 to calculate the luminance value based on a weighted sum of color component values associated with pixels within the mask 802 boundary. It will be understood that logic similar to the luminance value logic 1734 can be used in instances in which phenotype traits other than luminance reflectance are being quantified. For example, spectral reflectance logic can be used to calculate values of spectral reflectance phenomena exhibited in a captured image. It will also be understood that luminance value logic 1734 can be configured for phenotype covariates.

The outlier discarding logic 1736, when executed by the hardware processor 1703, can cause the processor to perform and provide functionalities including a discarding of FIG. 6 facial pixels 406 whose luminance values are outside of a threshold, to obtain facial skin pixels. For example, the outlier discarding logic 1736 can cause the hardware processor to discard outlier facial pixels among the facial pixels 406.

The outlier discarding logic 1736 operations and functionalities can implement, without limitations, operations described above in reference to the selecting 418 of facial skin pixels 420, or in combination with, operations and functionalities described above in reference to the FIG. 8 discard 804 of outlier pixels.

The FIG. 17 background extraction logic 1738 component of the relative reflectance quantifying logic 1710, when executed by the hardware processor 1703, can cause the processor to perform and provide functionalities including but not limited to operations and functionalities described above in reference to the obtaining 404 of facial pixels 406 and background pixels 408, or in combination with, operations and functionalities described above in reference to the FIG. 11 obtaining 1102 background pixels.

The FIG. 17 normalize luminance logic 1740, when executed by the hardware processor 1703, can cause the processor to perform operations and provide functionalities including but not limited to calculating a mean of the background pixels, or a portion of the background pixels then, based at least in part on the mean of the background pixels or portion thereof, normalizing the luminance values calculated by the FIG. 17 luminance value logic 1734. The result of the normalizing can be normalized luminance values. For purposes of description the mean of the background pixels or portion thereof can be referenced as a "first mean." The normalize luminance logic 1740 is representative of logic used to normalize data of interest (e.g., luminance values from facial skin reflectance) based on other data (e.g., background data) to correct for acquisition issues so the resultant data (in the case of skin reflectance, normalized skin data derived from data for facial skin pixels and background pixels) more accurately represents the data of interest in comparison to the raw data that has not been so transformed. In embodiments the normalize luminance logic 1740 can divide luminance values of the facial skin pixels by a mean of the intensities of the background pixels (the first mean) to obtain normalized luminance values of the facial skin pixels.

The relative reflectance quantifying logic 1710 can include relative reflectance computation logic that can calculate a mean of the normalized luminance values. For purposes of description the mean of the normalized luminance values can be referenced as a "second mean." The relative reflectance computation logic can compute the relative reflectance as, or as a value based on, the second mean.

This image dividing logic 1732 can implement instructions that permit the computer system 1702 to operate on facial pixels as shown in FIG. 8 and (separately or coextensively albeit with different processing resources) on the background pixels shown and discussed in conjunction with FIG. 11.

Background extraction logic 1738 comprises instructions that select from the remainder pixels a set of background pixels, as previously illustrated and described. Those of skill in the art will appreciate that the background obtaining logic 1738 is optional logic that can be used in a variety of situations to obtain relative values that, to some extent, may be used to address image acquisition phenomena exhibited in a captured image. For example, approaches that make use of spectral reflectance may benefit from such image processing techniques.

Relative reflectance quantifying logic 1710 comprises instructions that calculate a relative skin reflectance value for the captured image from a mean of the normalized luminance values of the facial skin pixels (the second mean). As discussed above other phenotypic characteristics may implement similar approaches to derive phenotypic data that is relative to other collected information.

The image processing logic, as shown in FIG. 17 and discussed above, can transform the computer system 1702 into a special-purpose computing system that functions to conserve processor use, in an embodiment. For example, when relative skin reflectance logic detects that the captured image is unsuitable for biometric comparison, the computer system 1702 is configured to not undertake resource-intensive, biometric matching since the outcome is unlikely to result in a suitable outcome, e.g., yes/no. This conserves system resources and, where a system offers the opportunity to retake the captured image, preserves processor resources for biometric data that have an improved likelihood of a correct match or, at least, a decreased likelihood of a non-conclusive result. In such a situation, where the captured image is unsuitable for use or cannot readily be enhanced for use, other steps can be taken such as performing non-automated identification.

The hardware processor 1703 may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD)

card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Conception and Development

Systems were evaluated based on their respective acquisition and attempted matching of facial images from a diverse population of 363 subjects in a controlled environment. Biometric performance was assessed using both efficiency (transaction times) and accuracy (mated similarity scores using a representative algorithm).

An automatic method for measuring relative facial skin reflectance using subjects' enrollment images was developed. The method quantified the effect of this metric and other demographic covariates on performance linear modeling. Both the efficiency and accuracy of the tested acquisition systems were affected by multiple demographic covariates including age, eyewear, and height.

Reflectance had the strongest net linear effect on performance. Linear modeling showed that lower skin reflectance was associated with lower efficiency (higher transaction times) and accuracy (lower similarity scores). Skin reflectance was also a statistically better predictor of these effects than self-identified labels.

Figure 18:
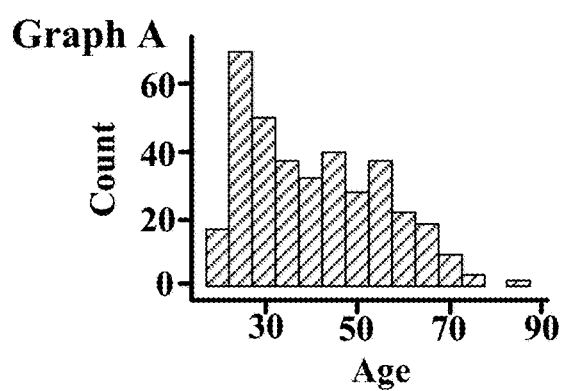
FIG. 18 shows distributions of variables self-reported by test subjects.
Figure 18:
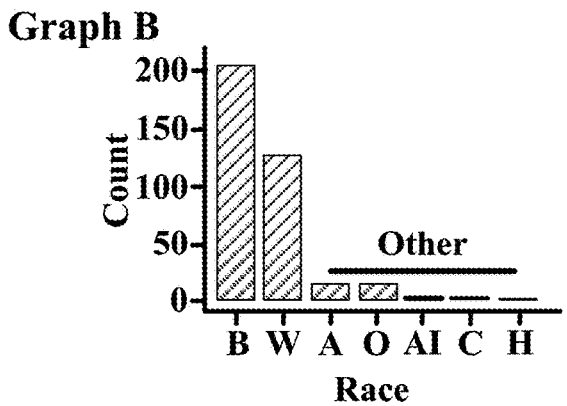
Figure 18:
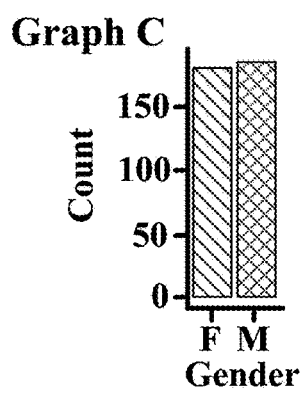
Figure 18:
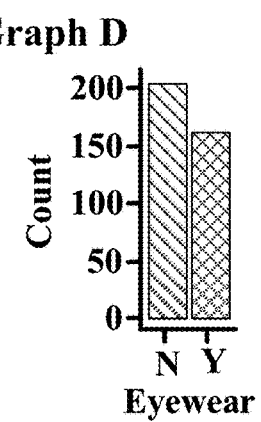
Figure 18:
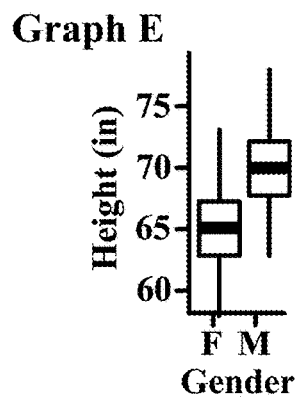
Figure 18:
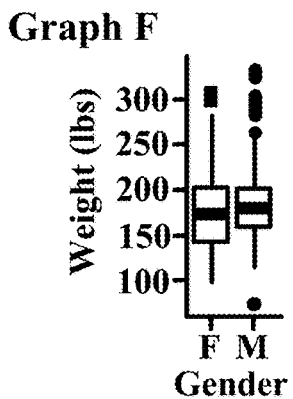

Unlike other covariates, the degree to which skin reflectance altered accuracy varied based on the system. FIG. 18 Graph B illustrates that the size of this skin reflectance effect was inversely related to the overall accuracy of the system such that the effect was almost negligible for the system with the highest accuracy. These results suggested that, in evaluations of biometric accuracy, the magnitude of differing effects depends on image acquisition.

The inventors carried out a large-scale scenario study. The study was designed to simulate a high-throughput biometric identification process. The study involved multiple facial recognition systems and measured the efficiency and effectiveness with which the systems acquired and matched face images from differing populations.

To understand the factors affecting the performance of face acquisition systems, the study gathered images and associated metadata. To evaluate the samples, the study used a reference algorithm to find the rank-one mated similarity score against two separate galleries, a gallery of same-day images, and a gallery of up to 4-year-old historic images.

A methodology for calculating the relative skin reflectance of each subject, using their same-day gallery images, is described below.

Models for the statistical relationship between the eleven tested biometric acquisition systems, mated similarity scores, and the collected/calculated covariates are discussed. The covariates include, among others, reflectance, population identifications, eyewear, age, height, and weight. The results show that biometric system performance is strongly affected by skin reflectance though this dependency varies base on the system.

The systems were tested using 363 volunteer subjects. Subjects selected population categories based on U.S. Census categories. FIG. 18 Graphs A, B, C, D, E, and F show distributions of variables self-reported by the test subjects.

Figure 19:
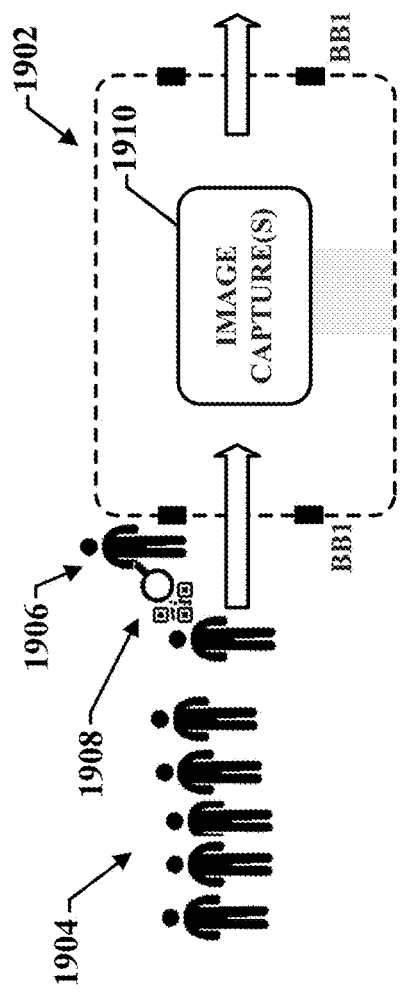
FIG. 19 shows a functional schematic of an example test system.

FIG. 19 shows a test subject queue state on a schematic of an example test system environment. The test system environment included a dedicated station 1902, and a subject queue 1904 at the station. Staff 1906 established the ground-truth identity of the subjects by scanning 1908 a QR code printed on the subject's wristband, subjects entered the test station, triggering a beam break BB1, subjects interacted with the face capture system, which submitted images (biometric samples) for storage, subjects exited the test station, triggering a beam break BB2. The duration of the subject's interaction with the system was measured as the difference in time between BB2 and BB1 and the images submitted by the systems were used to analyze biometric performance.

The test process and evaluation were designed to provide a systematic, repeatable framework for evaluating the acquisition speed and matching performance of the systems. Subjects were briefed as to the purpose of the tests. Subjects were asked to comply with all instructions presented by the systems but were not specifically instructed regarding the mechanistic details of the individual systems.

Subjects were organized into groups of approximately 15. Subjects entered the respective stations one-at-a-time after their ground truth identity was recorded. The order in which the groups and systems interacted were counterbalanced. The systems operated autonomously. Image submissions were made by each station in real time via a common, web-based application program interface (API).

Prior to participation, subjects were enrolled into a same-day face image gallery. Subjects stood in front of an 18% neutral gray background. Diffuse illumination was measured at 600-650 lux. A Logitech C920 camera at a 1-meter standoff (resolution: 1920×1080) was used to capture the reference image. Subjects were instructed to remove any hats or glasses and assume a neutral expression. Image quality issues were addressed by reacquiring images as appropriate. This resulted in a same-day face image gallery of 363 face samples from 363 unique people.

A historic reference face image gallery of 1,848 samples from 525 unique people (average of 3.5 images per person) was assembled. The samples were acquired over the course of four years using a variety of cameras including digital single lens reflex (DSLR) cameras, web cameras, and cameras embedded in biometric devices. The historic gallery contained images for 326 of the 363 test subjects that participated in the evaluation as well as 199 "distractors" or out of gallery subjects.

Performance of a facial recognition algorithm can be dependent on the pixel intensities of the provided facial images. In facial images, factors affecting skin pixel intensity can include (i) physical properties of the skin and underlying tissue (layers, absorbers, and scattering coefficients); (ii) physical properties of the skin surface (specular reflectance); and (iii) imaging artifacts (incident light intensity, camera gain).

Figure 20:
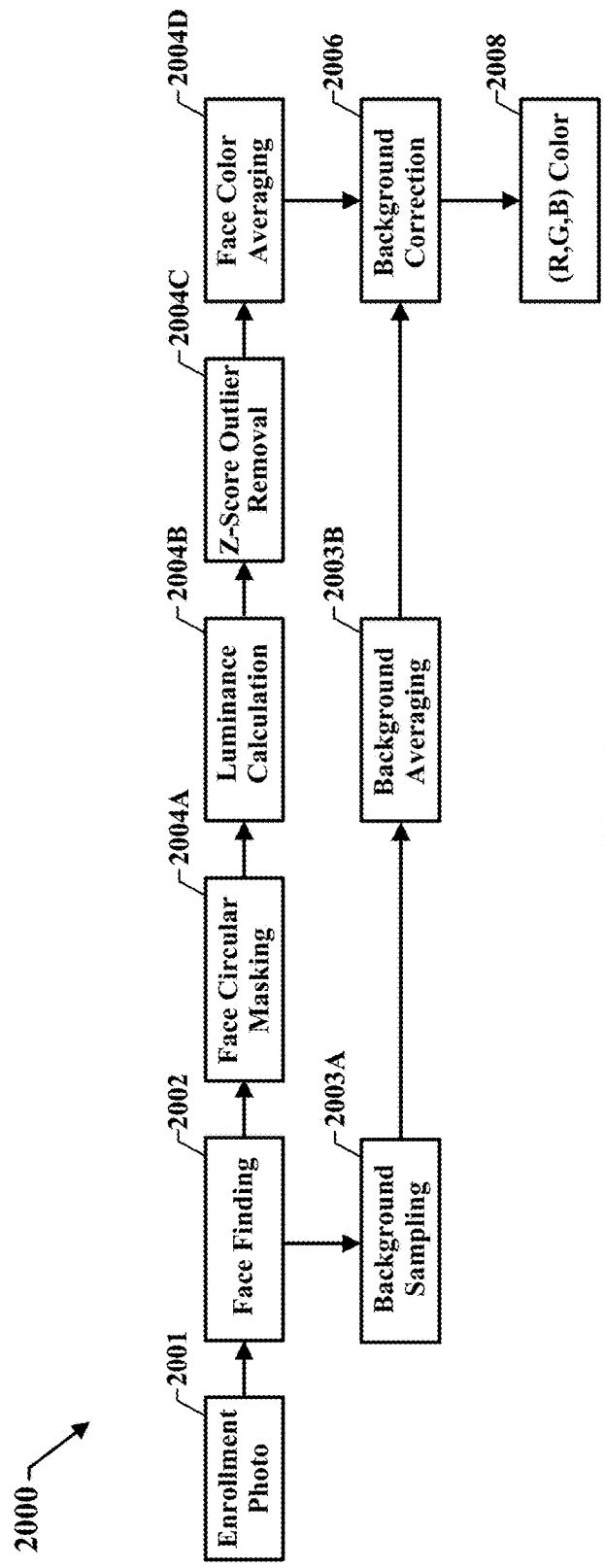
FIG. 20 shows an example logic flow diagram of a process for extracting skin (R, G, B) color values from enrollment images.

The FIG. 20 process 2000 included enrollment photo 2001 followed by face finding 2002 then, for reasons including but not limited to computation efficiency, proceeded using parallel computation processes. Using the arrangement of FIG. 20, the computations will be referenced as an "upper path" 2004 and a "lower path" 2003. The upper path 2004 includes circular mask 2004A, luminance calculation 2004B, Z-score outlier removal 2004C, and face color averaging 2004D. The lower path 2003, proceeding from the face finding 2002, includes background sampling 2003A, and background averaging 1903B. The process 2000 then applied background correction 2006 to the face color averaging 1904D, using the background averaging 2003B, producing normalized (R,G,B) color values 2008.

This method is distinct from non-linear color space transformations like CIELab color or YCbCr, in that the method's objective is not to measure skin color, which is a non-linear perceptual phenomenon captured by color spaces optimized for human perception, but to measure the physical skin properties, which can rely on light intensity measurements at specific wavelengths.

Because some image artifacts are multiplicative in nature and a constant reference region in the neutral 18% gray background existed, the average (R, G, B) color values from these facial skin pixels can be corrected for artifacts by divisive normalization using background regions selected from gray areas around the face. This operation corrects for camera exposure and incident light intensity. Other operations can be applied, for example, to address variations in shadows across the face or specular reflection, and to correct for camera color balance.

After background correction and outlier removal, the resulting (R, G, B) values can depend primarily on the physical properties of the skin and are proportional to the amount of incident light reflected from the face. The methodology for calculating this metric was based on the specific collection conditions used, namely, the consistent lighting, the same acquisition camera, and the constant neutral gray background. This method provided us with an estimate of the physical properties of the respective subject's skin obtained on independent samples.

One approach implemented Principal Components Analysis (PCA) on the (R, G, B) color values. The first two principal components (PC1 and PC2) explained 96.1% and 3.4% of the variance in (R, G, B) color values, respectively, collectively explaining 99.5% of the total color variance. This may relate to melanin and hemoglobin being the two main absorbers of light in skin, with most of the variation in reflectance across skin types due to melanin. This final metric, namely the position of the subject along PC1, is referred to here as a measure of their relative skin reflectance (e.g., reflectance).

Face images acquired by each system were matched using a commercially-available biometric algorithm against both the same-day and historic galleries. The set of mated similarity scores against the same-day gallery used samples from all 363 test subjects. The corresponding set for the historic gallery used samples from the 326 test subjects who had corresponding images in the historic gallery. For systems s∈S returning multiple face images, i∈I, mated similarity scores were examined for the last image acquired, (i)∈I, within the 20 second time interval following entry beam-break. Same-day mated similarity scores for subject j∈J is denoted $\Phi_{j,s}^{sd}=\phi_{(i)}$. For the historic gallery, which contained i∈I gallery images for each subject j∈J, the top mated similarity score $\Phi_{j,s}^{hist}=\max_{i\in I}\phi_i$ was used for statistical analysis. Some systems occasionally had technical issues or acquired images for individuals in the background causing them to submit a photo for the next or previous subject in the queue. The procedure used in the experiment therefore removed images for which the rank-one similarity score was higher than the mated similarity score. This occurred in fewer than 30 transactions across the systems (e.g., less than 1% of collected data was affected/removed) and manual review indicated that most were artifacts introduced during testing.

To estimate the overall average effects of factors, linear regression was applied to the subject's all-system average historic and same-day mated similarity scores $\bar{\Phi}$ as well as average transaction times $\bar{\Psi}$. Specifically, for each subject j using all N=11 systems, s, the average mated similarity score $\bar{\Phi}$ to the historic gallery as $$\bar{\Phi}_j = \frac{1}{N} \sum\nolimits_{s=1}^{s=N} \Phi_{j,s}^{hist}$$

and to the same-day gallery as $$\bar{\Phi}_j = \frac{1}{N} \sum\nolimits_{s=1}^{s=N} \Phi_{j,s}^{sd}$$

was computed. In constructing the linear model, eleven demographic covariates were considered, including three categorical variables. The continuous variables age, height, weight, and skin reflectance were normalized prior to fitting according to $z=(x-\mu_x)/\sigma_x$ and included their squared transformations in the full model for each response variable $\Theta_j \in \{\Psi_j, \bar{\Phi}_j\}$. The inclusion of interaction terms, which could lead to over-fitting, was not considered in this analysis.

$$\Theta_j = \beta_0 + \beta_1 \text{gender}_j + \beta_2 \text{eyewear}_j + \beta_3 \text{race}_j + \beta_4 \text{age}_j + \beta_5 \text{age}_j^2 + \beta_6 \text{height}_j + \beta_7 \text{height}_j^2 + \beta_8 \text{weight}_j^2 + \beta_{10} \text{reflectance}_j + \beta_{11} \text{reflectance}_j^2 + \epsilon_j \quad (1)$$

Model parameters β were estimated using ordinary least squares (OLS) fitting. The optimal all-system model was defined as one that minimizes the Akaike Information Criteria, $AIC=2k-2\ln(\hat{L})$, where k represents the number of estimated parameters in the model and $\hat{L}$ represents the maximum value of the model's fitted likelihood. Akaike Information Criteria (AIC) measures the goodness of fit of the model while discouraging over-fitting with a penalty for increasing the number of model parameters k. To find the optimal models, the full model was fit with all eleven covariates. A step-wise procedure was then applied in both directions using the stepAIC( ) function in the R package MASS. This procedure was applied to both the historic and same-day average mated similarity scores and average transaction times. Equation 2 describes a final optimal model with k−1 covariates selected, for the $j^{th}$ subject.

$$\left.\begin{array}{rl} x_j &= [x_{1,j}, x_{2,j}, \ldots x_{k-1,j}] \\ \beta &= [\beta_1, \beta_2, \ldots \beta_{k-1}] \\ \Theta_j &= \beta_0 + \beta^T x_j + \epsilon_j \end{array}\right\} \quad \text{Equation (2)}$$

The accuracy of model fits was assessed through residual analysis. For three optimal all-system models, the study found the residuals deviated from normality, with noticeable deviations present in the QQ plots of the response variables $\Theta_j$ (data not shown). Confidence intervals for model parameter estimates were therefore obtained using a bootstrapping technique instead of relying on the standard error. One thousand bootstrap samples were generated and the bias-corrected bootstrapped confidence intervals or the BCα for each of the fitted coefficients in the optimal model were calculated.

The model selection approach showed that some covariates did not improve model fit sufficiently as judged using AIC and are therefore excluded from the optimal model. The non-parametric technique of cross-validation was used to independently confirm the optimality of select covariates included in the optimal model. Tenfold cross-validation was used and compared the cross-validated $R^2$ of the optimal model to a model where a covariate present in the optimal model is replaced by an alternate covariate that is not present in the optimal model. Since the exact fold compositions and therefore the cross-validated $R^2$ values are dependent on a random seed, this procedure was executed with 100 randomly drawn starting seeds to compute the mean and 95% confidence intervals for the cross-validated $R^2$ values.

Average linear regression models were applied to ascertain effects of different populations on all-system average mated similarity scores and average transaction times. However, because the 363 subjects interacted with the systems studied, it was examined whether mated similarity scores for images acquired on different systems had distinct demographic covariate effects. To model these effects, linear mixture modeling was applied with the system s as the random effect. To start, demographic covariates were retained in the optimal model from Equation 2 as fixed effects. This allowed for modeling of the response variable by estimating both the variance across all systems (fixed effects: $\beta_0$ and $\beta_T$) and the variance between different systems (random effects: $\beta_{0,s}$ and $\beta_s^T$) according to Equation 3 where y is the set of m selected system-specific slope covariates and $\beta_s$ are the corresponding parameters.

$$\left.\begin{array}{rl} y_j &= [y_{1,j}, y_{2,j}, \ldots y_{m,j}] \\ \beta_s &= [\beta_{1,s}, \beta_{2,s}, \ldots \beta_{m,s}] \\ \Theta_{j,s} &= \beta_0 + \beta^T x_j + \beta_{0,s} + \beta_s^T y_j + \epsilon_j + \gamma_s \end{array}\right\} \quad \text{Equation (3)}$$

Starting with only the fixed effects model, a system-specific slope $\beta_{0,s}$ was added. If this reduced AIC, it signified that there are statistical performance differences between systems. Then, given the intercept model that includes $\beta_{0,s}$, a forward model selection approach was used to identify the mixed individual effects that continue to minimize AIC, adding each demographic covariate ($y_j$) one at a time. A reduction in AIC for a given demographic covariate signifies the inclusion of a system-specific coefficient for this variable improves model fitness and thus, there are notable performance differences between stations for this demographic factor. This procedure was performed for the historic gallery similarity scores. Since the goal of this analysis was to estimate the system-specific effects, all model parameters β were estimated by maximizing the restricted maximum likelihood (REML).

The effects of skin reflectance on similarity scores were measured using linear modeling. To identify the overall effect of subject demographics on similarity scores, an average similarity score for each subject on all eleven tested systems was computed. To examine longitudinal changes in appearance (e.g., changes in attire, self-styling, and ageing), separate models were fit to average similarity scores obtained from matching images to the historic and to the same-day galleries. Starting with a model including eleven demographic covariates (Equation 1), an AIC-based model selection approach was used to find an optimal model including only those demographic covariates that improved model fit while minimizing the number of model parameters. Following model selection, the 95% bootstrapped, bias-corrected confidence intervals (BCα) were computed for each parameter.

FIG. 18 shows average mated similarity scores varying in relation to skin reflectance and gender. Points show the average mated similarity scores for female and male subjects, with lighter points showing average mated similarity scores for individual subjects and darker points showing the grand average of scores across subjects, binned by reflectance quartile. Lines indicate optimal age and gender model fits, fixing other factors constant at the average value of the subject population in each facet. The box plots within the facet show marginal distributions of similarity scores by self-reported gender.

Plotting average mated similarity scores as a function of skin reflectance, age bins, and gender, as shown in FIG. 19, showed that scores tended to be lower for subjects with lower reflectance values for both the historic and same-day galleries. For the historic gallery, scores for male subjects were notably higher than for female subjects. For the same-day gallery, however, male and female subjects tended to have similar score distributions. Further, scores for younger subjects tended to be lower for the historic gallery. The linear fits depicted in FIG. 19 do not include the effect of eyewear; those who reported wearing some form of eyewear had lower scores for both same-day and historic galleries.

Table 1 below shows parameter estimates for the optimal models, fitting all-system average same-day and historic similarity scores.

TABLE 1

| Covariate | Estimate | BCα | Range | Net Effect |
|---|---|---|---|---|
| Optimal Historic Model | | | | |
| $\hat{\beta}_0$ Intercept | 0.830 | (0.817, 0.841) | NA | NA |
| $\hat{\beta}_1$ Gender | 0.034 | (0.022, 0.048) | {0, 1} | 0.034 |
| $\hat{\beta}_2$ Eyewear | −0.025 | (−0.039, −0.012) | {0, 1} | 0.025 |
| $\hat{\beta}_4$ Age | 0.007 | (0.001, 0.013) | (−1.47, 3.09) | 0.032 |
| $\hat{\beta}_7$ Height$^2$ | −0.006 | (−0.011, 0.0002) | (0.0004, 7.43) | 0.041 |
| $\hat{\beta}_{10}$ Reflectance | 0.016 | (0.009, 0.024) | (−2.41, 2.39) | 0.075 |
| Optimal Same-Day Model | | | | |
| $\hat{\beta}_0$ Intercept | 0.894 | (0.885, 0.900) | NA | NA |
| $\hat{\beta}_1$ Gender | −0.019 | (−0.029, −0.009) | {0, 1} | 0.019 |
| $\hat{\beta}_2$ Eyewear | 0.005 | (0.0001, 0.011) | (−2.33, 2.73) | 0.027 |
| $\hat{\beta}_4$ Age | −0.004 | (−0.008, 0.001) | (0.0004, 7.43) | 0.027 |
| $\hat{\beta}_7$ Height$^2$ | −0.005 | (−0.011, 0.001) | (−2.61, 3.50) | 0.031 |
| $\hat{\beta}_{10}$ Reflectance | 0.010 | (0.006, 0.016) | (−2.41, 2.39) | 0.050 |

Parameters not included in the optimal model are not shown (see Equation 1). 95% confidence intervals BCα are estimated using bootstrap. Net effect of the covariate is estimated as the product of $\hat{\beta}$ and the magnitude of the observed range of values for the covariate |max−min|. The units of similarity scores are arbitrary.

Table 1 shows the estimates, 95% confidence intervals (BCα), and the net effect of each coefficient (β) in the optimal historic and same-day gallery model of mated similarity scores. The net effect of a covariate was estimated as the product of $\hat{\beta}$ and the magnitude of the observed range of values for the covariate |max−min|. By this metric, reflectance was the covariate with the single greatest net effect on mated similarity scores with a net effect equal to roughly 10% of the intercept value of the historic similarity scores and roughly 6% of the intercept of the same-day similarity scores.

Figure 22:
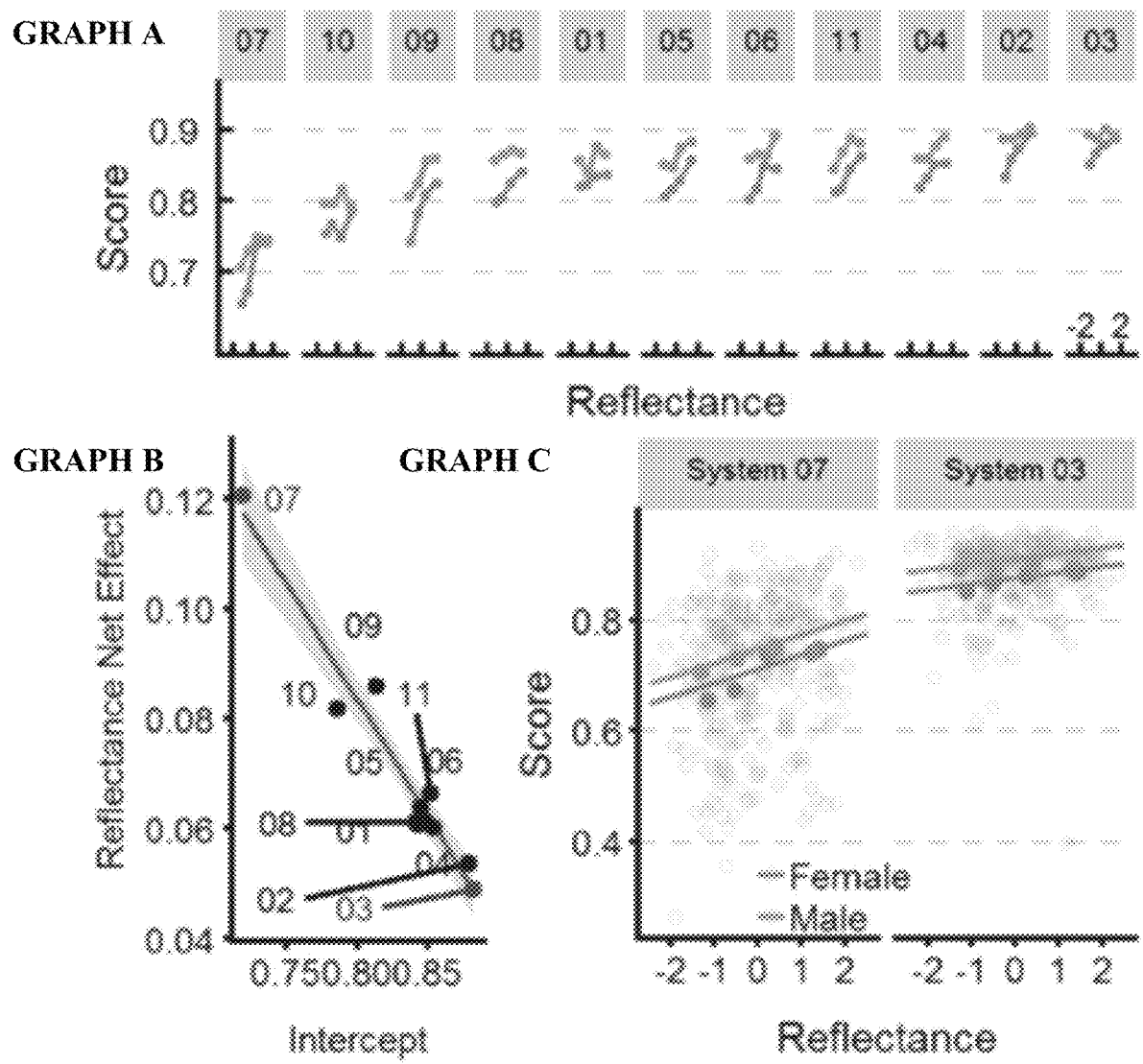
FIG. 22 graphically depicts other biometric evaluation results.

Consistent with visual impressions from FIG. 22, fitted parameter estimates for the historic gallery model indicated that average mated similarity scores decreased significantly for younger subjects, those who identified as female, those with lower skin reflectance and those who reported eyewear. The effect of height on mated similarity scores was negative, suggesting deviations from average height decreased the scores. BCα for this factor, however, overlapped 0 in both the same-day and historic model. The effects of height, eyewear, and skin reflectance also appeared in both models. Notably, age and gender only appeared as covariates in the historic model, indicating that these covariates did not influence same-day similarity scores. Weight was present in the same-day optimal model, but BCα for this factor overlapped 0.

The effects of demographic factors on the time required for subjects to complete biometric transactions was also measured and found large effects for subjects with eyewear and lower skin reflectance. Transaction times were measured at the respective stations as the time interval between subjects crossing the entry and exit beam breaks, which included all interactions with the biometric face capture system, as shown in FIG. 19. Linear modeling was used to measure the net effect of demographic covariates on all-system average transaction times. Table 2 shows the estimated coefficients along with their 95% confidence intervals (BCα) and net effect for each covariate in the optimal transaction time model.

TABLE 2

| Covariate | Estimate | BCα | Range | Net Effect |
|---|---|---|---|---|
| Optimal Time Model | | | | |
| $\hat{\beta}_0$ Intercept | 6.161 | (5.933, 6.417) | NA | NA |
| $\hat{\beta}_1$ Gender | −0.238 | (−0.473, 0.029) | {0, 1} | 0.238 |
| $\hat{\beta}_2$ Eyewear | 0.317 | (0.050, 0.557) | {0, 1} | 0.317 |
| $\hat{\beta}_4$ Age | 0.250 | (0.114, 0.387) | (−1.47, 3.09) | 1.139 |
| $\hat{\beta}_5$ Age$^2$ | 0.134 | (0.018, 0.270) | (0.0001, 9.53) | 1.257 |
| $\hat{\beta}_7$ Height$^2$ | 0.116 | (0.021, 0.223) | (0.0004, 7.43) | 0.860 |
| $\hat{\beta}_{10}$ Reflectance | −0.258 | (−0.384, −0.144) | (−2.41, 2.39) | 1.235 |

Transaction times increased significantly for subjects who reported eyewear, those with lower skin reflectance, and had a complex relationship with subject height and age (both linear and quadratic factors included). Again, skin reflectance was the factor with the greatest net effect, this time on transaction time, with a net effect of 20% on the intercept transaction time of 6.2 seconds. These results indicate that demographic factors significantly affected not only biometric matching effectiveness, but also the efficiency of biometric acquisitions.

Table 2, above, gives parameter estimates for optimal models, fitting all-system average transaction times. Parameters not included in the optimal model are not shown (see Equation 1). 95% confidence intervals BCα are estimated using a bootstrap approach. Net effect of the covariate is estimated as the product of $\hat{\beta}$ and the magnitude of the observed range of values for the covariate |max−min|. The unit of transaction time is seconds.

The optimal models for average historic and same-day similarity scores as well as average transaction times presented in Table 1 and Table 2 all retained skin reflectance as an explanatory variable. This suggested that the new phenotypic metric of relative skin reflectance is a better predictor of similarity score and transaction time than demographic categories. To confirm this finding, cross-validated R2 for optimal models that include reflectance and non-optimal models were compared.

Referring to FIG. 22, the net effect of relative skin reflectance is compared for systems with lower historic mated similarity scores. FIG. 22 Graph A shows the mated similarity scores by acquisition system. In each facet, colored points plot average scores across subjects binned by reflectance quartile. Facets are arranged based on the average similarity score produced by the acquisition system. FIG. 22 Graph B shows linear modeling estimates, of the reflectance net effect on mated similarity scores ($\beta_{10}+\beta_{10,s}$) ΔReflectance (where ΔReflectance is the span of observed reflectance values) plotted as a function of system-specific intercept ($\beta_0+\beta_{0,s}$). Note the decreasing net effect of reflectance with the increasing level of performance (intercept). Points marked in red correspond to stations with the highest and lowest intercepts detailed in B. FIG. 22 Graph C shows a distribution of mated similarity scores for systems marked red in B. Light points denote individual subject mated similarity scores. Dark colored points denote average scores across subjects binned by reflectance quartile. Lines indicate optimal age and gender model fits, fixing other factors constant at the average value of the subject population in each facet. Note the higher net effect of reflectance on mated similarity scores some systems as well as lower overall mated similarity scores.

As shown in FIG. 22 Graph A, it was found that average similarity scores, and the net effect of demographic covariates on historic similarity scores could vary between systems. To compare demographic effects across systems, the mated similarity scores of probes to historic gallery images were modeled across all tested systems using mixed effects models. To identify those demographic covariates that varied between systems, model selection was performed using AIC, starting with the baseline optimal model selected for explaining all-system average similarity scores. Table 3 also shows several mixed effects models, namely the random intercept model (Optimal+$\hat{\beta}_{0,s}$) and models with random slopes included (Optimal+$\hat{\beta}_{0,s}$+$\beta_{n,s}$covariate$_j$+$\gamma_s$). From Table 3, note that AIC was reduced (i.e., the model was improved) with the addition of the random intercept $\hat{\beta}_{0,s}$, indicating that there were performance differences between systems. AIC was further reduced only with the addition of a random slope parameter on reflectance $\hat{\beta}_{10,s}$, indicating that reflectance, but not other covariates, had different effects on the performance of different systems.

TABLE 3

| Historic Model | AIC |
| --- | --- |
| Optimal | −6219.808 |
| Optimal + $\hat{\beta}_{0,s}$ + $\gamma_s$ | −7069.695 |
| Optimal + $\hat{\beta}_{0,s}$ + $\beta_{1,s}$gender$_j$ + $\gamma_s$ | −7065.695 |
| Optimal + $\hat{\beta}_{0,s}$ + $\beta_{2,s}$eyewear$_j$ + $\gamma_s$ | −7065.723 |
| Optimal + $\hat{\beta}_{0,s}$ + $\beta_{4,s}$age$_j$ + $\gamma_s$ | −7069.181 |
| Optimal + $\hat{\beta}_{0,s}$ + $\beta_{7,s}$height$_j^2$ + $\gamma_s$ | −7067.857 |
| Optimal + $\hat{\beta}_{0,s}$ + $\beta_{10,s}$reflectance$_j$ + $\gamma_s$ | −7074.124 |

Table 3 shows AIC values for fixed and mixed effects models fitted to historic mated similarity scores. The optimal historic model is as in Table 1. $\hat{\beta}_{0,s}$ is the random system intercept and $\beta_{0,s}$ are the random system slopes for each named covariate.

The mixed effect modeling approach shows that a model which includes 1) the original fixed effects, 2) the system-specific intercept, and 3) a system-specific slope associated with reflectance, minimized the AIC. The coefficients of this optimal model are shown in Table 4. The fixed effect coefficients of the selected mixed effect model are approximately equal to the fixed effect coefficients of the selected average model. This demonstrates a consistency in modeling and that the average model in Table 1 is not unduly affected by system-specific outliers.

TABLE 4

| | Covariate | Estimate | CI | Range |
| --- | --- | --- | --- | --- |
| $\hat{\beta}_0$ | Intercept | 0.833 | (0.806, 0.860) | NA |
| $\hat{\beta}_7$ | Height² | −0.006 | (−0.008, −0.003) | (0.0004, 7.43) |
| $\hat{\beta}_1$ | Gender | 0.034 | (0.028, 0.039) | {0, 1} |
| $\hat{\beta}_2$ | Eyewear | −0.023 | (−0.029, −0.017) | {0, 1} |

TABLE 4-continued

| | Covariate | Estimate | CI | Range |
| --- | --- | --- | --- | --- |
| $\hat{\beta}_4$ | Age | 0.007 | (0.005, 0.010) | (−1.47, 3.09) |
| $\hat{\beta}_{10}$ | Reflectance | 0.014 | (0.011, 0.018) | (−2.41, 2.39) |
| $\hat{\beta}_{0,s}$ | System Intercept | * | * | (0.71, 0.88) |
| $\hat{\beta}_{10,s}$ | System Reflectance | * | * | (0.01, 0.03) |

Figure 21:
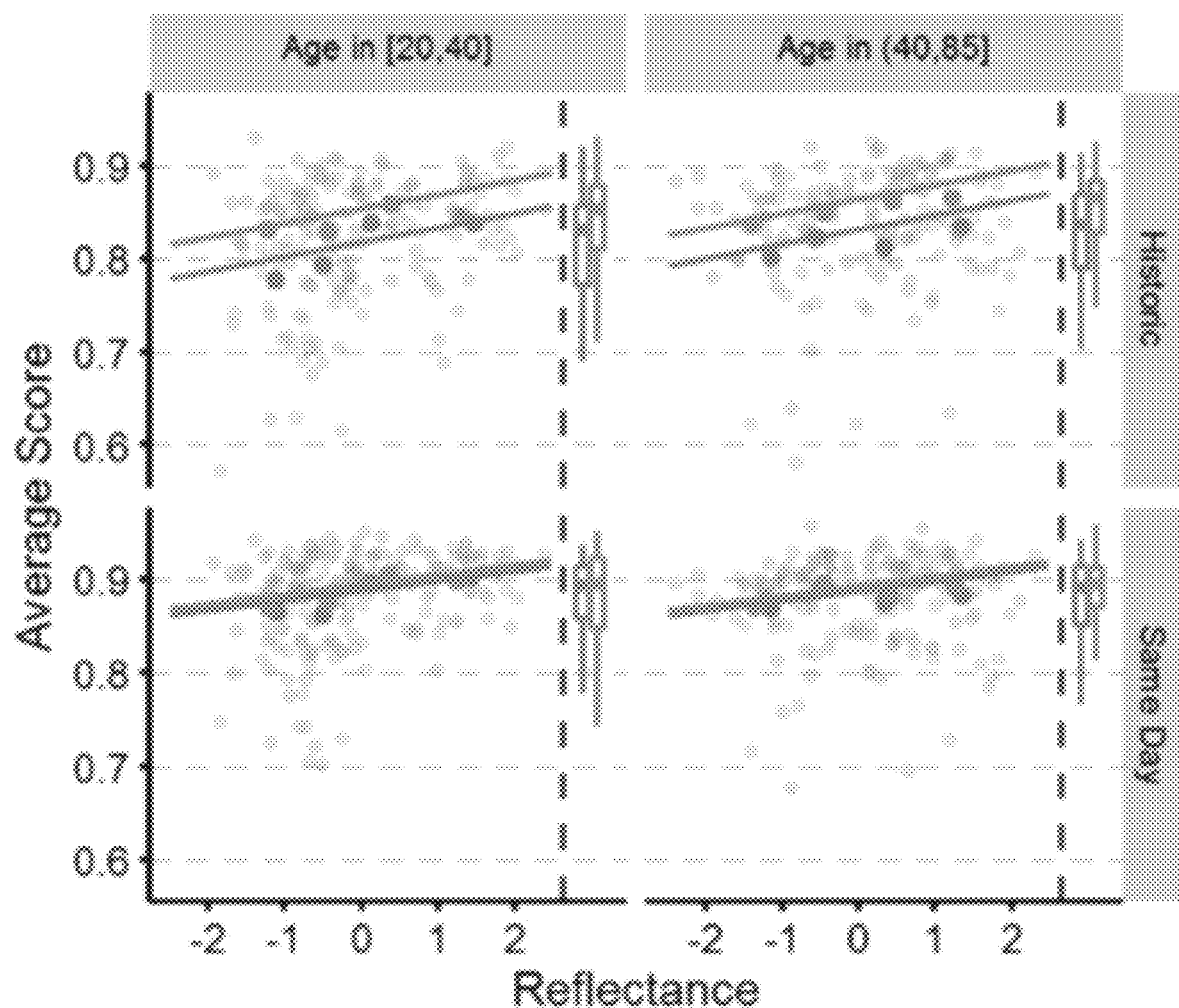
FIG. 21 graphically depicts example biometric evaluation results.

Table 4 shows parameter estimates and confidence intervals of the mixed-effects model fitted to mated similarity scores across systems. $\hat{\beta}_{1,s}$ represents the random intercept parameter and $\hat{\beta}_{2,s}$ represents the random slope parameter, which vary by system s. Mixed effects parameter estimates and associated 95% confidence intervals (marked with *) are plotted in FIG. 21.

In the selected model, the difference in overall performance is captured by the system-specific intercept $\hat{\beta}_{0,s}$ and system-specific variation from reflectance is captured by the reflectance slope $\hat{\beta}_{10,s}$. Plotting the net effect of system-specific reflectance $((\beta_{10}+\beta_{10,s})^*\Delta_{Reflectance}$, where $\Delta_{Reflectance}$ is the span of observed reflectance values) on mated similarity scores versus the system-specific intercept of each system showed that systems with lower overall levels of performance also showed a greater net effect of reflectance on mated similarity scores (FIG. 22, Graph B). In other words, better overall quality acquisition systems can maintain high performance across the full range of skin reflectance values. Systems 3 and 7 show the largest difference between system-specific intercepts, with a 0.16 difference in mated similarity scores. This value is comparable to the largest net effect of reflectance—a difference of 0.12 in mated similarity score between the highest and lowest reflectance observed on System 7. These differences are illustrated in FIG. 22, Graph C, which allows visual inspection of the net effect of reflectance and acquisition system on mated similarity scores.

These analyses show that some factors influenced both the speed and accuracy of the evaluated systems. For example, modeling showed that mated similarity scores were higher for men versus women, for older versus younger people, for those without eyewear, and those with relatively lighter skin. Of the different covariates examined, the calculated measure of skin reflectance had the greatest net effect on average biometric performance (Table 1 and Table 2). For mated similarity scores, the fixed effects of gender, eyewear, and age were constant across the tested systems while the magnitude of the random effect of skin reflectance varied between systems in a manner inversely correlated with overall system accuracy, as seen in FIG. 22.

The inverse relationship between the net effect of skin reflectance observed for a system and that system's overall performance (see Graph B in FIG. 22) has implications. The data shows that systems with better overall performance had improved performance most for individuals with lower skin reflectance. Thus, a woman with lower skin reflectance using a superior system was more likely to match her mated gallery images than a man with higher skin reflectance using an inferior system.

Another consequence of these results is that deploying a superior biometric acquisition system may significantly reduce or eliminate performance differences between some demographic groups. Indeed, in the data set, image quality varied between acquisition systems. Acquisition system differences can strongly affect (magnify or eliminate) measured differences in algorithm accuracy across demographic categories.

Some factors have differing effects on transaction times (Table 2) and, in addition to effects of reflectance, gender and age, biometric performance also varied with volunteer height and weight. For high-throughput biometric systems, small changes in transaction times can lead to large changes in system throughput (e.g., reducing a five second transaction time by one second increases throughput by 25%). Effects of height and weight on transaction times can be expected for the tested systems since some systems adjusted camera position based on the subject. Subject anthropometry may alter the speed with which systems adjusted to the respective subjects and the speed with which the subjects used the systems. Differences in face angle associated with subject height may explain the effect of this covariate on similarity scores. Taken together, these findings indicate that the acquisition system, independent of the matching algorithm, can contribute to total biometric system performance across different subject groups.

Two images of the same person taken on different occasions may differ systematically with the passage of time due to face aging. Here demographic effects on mated scores for images taken on the same day versus on different days (1 month to 4 years) were compared. Gender and age covariates were notably found to be excluded from optimal models of same-day similarity scores. This finding suggests that faces of older people in the sample may be more stable in their appearance over time relative to younger people. On the other hand, faces of women in the sample are more variable over time relative to men, possibly due to differences in hair-styling and makeup. That skin reflectance was preserved as a covariate in optimal models of same-day scores argues that this effect, as expected, is a fixed trait of the subject and varies little over time.

Conclusion

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

While some blocks/decisions may be captioned as "optional", there is to be no negative inference with respect blocks/decisions that are not denominated as "optional", i.e., blocks/decisions are not "mandatory." In accordance with some embodiments, information is stored in memory (at least temporarily) during performance of the methods for a variety of reasons. Example rationales include, but are not limited to, data processing convenience, communication convenience, permit batch validation/review, records maintenance, and so on, and combinations thereof.

Although headings are used for the convenience of the reader, these are not be taken as limiting or restricting the systems, techniques, approaches, methods, devices to those appearing in any particular section. Rather, the teachings and disclosures herein can be combined, rearranged, with other portions of this disclosure and the knowledge of one of ordinary skill in the art. It is the intention of this disclosure to encompass and include such variation.

What is claimed is:

1. An apparatus for quantification of phenotypes in received captured images and remediation of image capture, for biometric matching, comprising:
    a processing system having a hardware processor configured to perform a predefined set of basic operations by loading corresponding ones of a predefined native instruction set of codes, the predefined native instruction set of codes constituting a set of instructions selectable for execution by the hardware processor;

a memory accessible to the processing system;

a communication controller, under control of the processing system, adapted to receive an indication that a first relative skin reflectance value derived from a first image of a subject is outside of a predetermined range;

image processing logic, stored in the memory, comprising a respective sequence of instructions selected from the predefined native instruction set of codes of the hardware processor, adapted to calculate an adjustment of one or more conditions for capture of a second image of the subject, as a remedial capture setting;

image capture logic, stored in the memory, comprising another respective sequence of instructions selected from the predefined native instruction set of codes of the hardware processor, adapted to capture the second image of the subject under the remedial capture setting;

the image processing logic being further adapted to:
derive, from the second image, a second relative skin reflectance value for a face of the subject;

a post capture reflectance correction logic configured to apply post processing to the second image to form a processed second image;

the post processing configured to adjust the second relative reflectance value of the second image to be above a floor threshold and a below a ceiling threshold;

the image processing logic configured to determine that the second relative reflective value of the processed second image is either below the floor threshold or above the ceiling threshold despite the adjustment made by the post capture reflectance correction logic;

a reference images gallery configured to store a reference image of the subject; and a fallback biometric identification logic triggered to perform biometric comparison between the processed second image and a stored reference image when the second relative reflective value of the processed second image is either below the floor threshold or above the ceiling threshold.

2. The apparatus of claim 1, further comprising the image processing logic being further adapted to calculate a change of gain of a camera, used to capture the first image of the subject and second image of the subject.

3. The apparatus of claim 1, further comprising the image processing logic being further adapted to calculate an adjustment of a spectral sensitivity of a camera, used to capture the first image of the subject and second image of the subject.

4. The apparatus of claim 3, further comprising the image processing logic being further adapted to calculate an adjustment of intensity of light from a light source, used to illuminate the subject during capture of the first image of the subject and the second image of the subject.

5. The apparatus of claim 1, further comprising the image processing logic being further adapted to calculate an adjustment of diffusivity of light from a light source, used to illuminate the subject during capture of the first image of the subject and the second image of the subject.

6. The apparatus of claim 1, further comprising the image processing logic being further adapted to calculate an adjustment of a number of light sources used to illuminate the subject.

7. The apparatus of claim 1, further comprising the image processing logic being further adapted to calculate a change of a background placed behind the subject during capture of an image.

8. The apparatus of claim 1, further comprising biometric identifying logic, stored in the memory, comprising another respective sequence of instructions selected from the predefined native instruction set of codes of the hardware processor, adapted to perform a biometric comparison between the second image and gallery images, when the second relative skin reflectance value is above the floor threshold and below the ceiling threshold.

9. The apparatus of claim 8, further comprising the biometric identifying logic being further adapted to:
identify the subject as an individual associated with a corresponding one of the gallery images most closely matching the second image, when a result of the biometric comparison exceeds a matching threshold; and
output an identity indication message indicating an identity of the individual.

10. The apparatus of claim 9, further comprising:
an electronic access control logic, comprising another respective sequence of instructions selected from the predefined native instruction set of codes of the hardware processor, adapted to generate an access control message, based at least in part on the identity indication message, the access control message instructing an electronically actuated access control device to perform an access control action, the access control action being to open, to maintain a state of being open, to close, or to maintain a state of being closed; and
the communication controller being further adapted to transmit, to the electronically actuated access control device, the access control message.

11. The apparatus of claim 8, further comprising the biometric identifying logic being further adapted to output an identity indication message indicating an identity of the subject.

12. A method for quantification of phenotypes in received captured images and remediation of image capture, for biometric matching, comprising:
identifying that a first relative reflectance value, derived from a first image of a subject, is outside of a predetermined range of reflectance and, based at least in part on the identifying:
calculating a remedial capture setting;
communicating the remedial capture setting to an image capturing resource;
upon receiving a second image of the subject, captured by the image capturing resource under the remedial capture setting;
deriving from the second image of the subject a second relative reflectance value, the second relative reflectance value being for at least a portion of an image of a face of the subject; and
post capture reflectance correction logic applying post processing to the second image;
the post processing adjusting the second relative reflectance value of the second image to be above a floor threshold and a below a ceiling threshold;
image processing logic determining that the second relative reflective value of the processed second image is either below a floor threshold or above a ceiling threshold despite the adjustment made by the post capture reflectance correction logic;
a reference images gallery storing a reference image of the subject; and
a fallback biometric identification logic performing biometric comparison between the processed second image and a stored reference image when the second relative reflective value of the processed second image is either below the floor threshold or above the ceiling threshold.

13. The method of claim 12, further comprising calculating, as part of the remedial capture setting, an update of at least one setting of at least one camera of the image capturing resource, for capturing the second image.

14. The method of claim 12, further comprising calculating, as part of the remedial capture setting, an update of a gain of a camera of the image capturing resource, for capturing the second image.

15. The method of claim 12, further comprising calculating, as part of the remedial capture setting, an update of a spectral sensitivity of a camera of the image capturing resource, for capturing the second image.

16. The method of claim 12, further comprising calculating, as part of the remedial capture setting, an updating of an illumination setting, for illuminating of the subject by the image capturing resource during the capturing the second image.

17. The method of claim 12, further comprising calculating, as part of the remedial capture setting, an updating of a diffusivity of light from a light source for illuminating of the subject by the image capturing resource during the capturing the second image.

18. The method of claim 12, further comprising calculating, as part of the remedial capture setting, a change in a number of light sources for illuminating of the subject by the image capturing resource during the capturing the second image.

19. The method of claim 12, further comprising calculating, as part of the remedial capture setting, a change in a background placed behind the subject during capture of an image.

20. The method of claim 12, further comprising performing a biometric comparison between the second image and gallery images, when the second relative reflectance value is within the window of suitable reflectance values.

21. The method of claim 20, further comprising:
based at least in part on a positive result of determining whether the second relative reflectance value meets the window of suitable reflectance values, performing a biometric comparison of the second image of the identifying the subject as an individual associated with a corresponding one of the gallery images, most closely matching the second image, when a result of the biometric comparison exceeds a matching threshold; and
outputting an identity indication message indicating an identity of the subject.

22. The method of claim 21, further comprising instructing an electronic access control device to open based, at least in part, on the identity of the subject.

23. The method of claim 20, further comprising requesting non-automated identification of the subject when the biometric comparison with all the gallery images is below a matching threshold.

* * * * *